US012215558B2

(12) United States Patent
McAllister

(10) Patent No.: US 12,215,558 B2
(45) Date of Patent: Feb. 4, 2025

(54) PIPE CUTTING APPARATUS

(71) Applicant: Arkane Technology Ltd, Linlithgow (GB)

(72) Inventor: Lawrence McAllister, Aberdeen (GB)

(73) Assignee: Arkane Technology Ltd (GB)

( * ) Notice: Subject to any disclaimer, the term of this patent is extended or adjusted under 35 U.S.C. 154(b) by 793 days.

(21) Appl. No.: 17/430,008

(22) PCT Filed: Feb. 11, 2020

(86) PCT No.: PCT/GB2020/050310
§ 371 (c)(1),
(2) Date: Aug. 11, 2021

(87) PCT Pub. No.: WO2020/165573
PCT Pub. Date: Aug. 20, 2020

(65) Prior Publication Data
US 2021/0387269 A1 Dec. 16, 2021

(30) Foreign Application Priority Data
Feb. 11, 2019 (GB) ...................................... 1901894

(51) Int. Cl.
*E21B 29/00* (2006.01)
*B23D 21/14* (2006.01)
*E21B 23/01* (2006.01)

(52) U.S. Cl.
CPC .......... *E21B 29/002* (2013.01); *B23D 21/145* (2013.01); *E21B 23/01* (2013.01); *E21B 29/005* (2013.01)

(58) Field of Classification Search
CPC ..... B23D 21/145; E21B 23/01; E21B 29/005; E21B 29/002
See application file for complete search history.

(56) References Cited

U.S. PATENT DOCUMENTS 1,358,818 A 11/1920 Berging
3,859,877 A 1/1975 Sherer et al.
(Continued)

FOREIGN PATENT DOCUMENTS

EP 3085882 A 10/2016
WO 2018063003 A2 4/2018
WO WO-2024003561 A1 * 1/2024 ........... E21B 29/005

OTHER PUBLICATIONS

International Search Report for PCT/GB2020/050310, mailed Apr. 17, 2020, 3 pages.

*Primary Examiner* — Daniel P Stephenson
(74) *Attorney, Agent, or Firm* — Dickinson Wright PLLC

(57) ABSTRACT

The present disclosure provides an apparatus for removing material from an internal surface of a pipe. The apparatus comprises a low-power cutting tool for insertion into the pipe and configured to remove material from an internal surface of the pipe. The cutting tool comprises a housing for insertion within the pipe, a cutting head extending from the housing and a cutting tip for machining the internal surface of the pipe in a machining operation when the cutting tool is inserted into the pipe, and one or more actuators for driving the cutting tip. The apparatus further comprises one or more processors, and a computer-readable memory storing instructions which, when executed by the one or more processors, control the one or more actuators to cause the cutting tip to machine the internal surface of the pipe, such that the cutting tool is maintained in a low-power configuration.

18 Claims, 16 Drawing Sheets

(56) References Cited

U.S. PATENT DOCUMENTS

| | | | |
|---|---|---|---|
| 8,210,251 B2* | 7/2012 | Lynde | E21B 27/005 |
| | | | 166/66.4 |
| 2007/0131410 A1 | 6/2007 | Hill et al. | |
| 2008/0092356 A1 | 4/2008 | Fuhst et al. | |
| 2008/0236828 A1 | 10/2008 | Fuhst et al. | |
| 2011/0297379 A1 | 12/2011 | Laird et al. | |
| 2012/0145394 A1* | 6/2012 | Jensen | E21B 29/002 |
| | | | 166/55.7 |
| 2014/0124191 A1 | 5/2014 | Hallundbaek | |
| 2018/0298710 A1 | 10/2018 | Foubister | |
| 2021/0387269 A1* | 12/2021 | McAllister | E21B 29/005 |

* cited by examiner

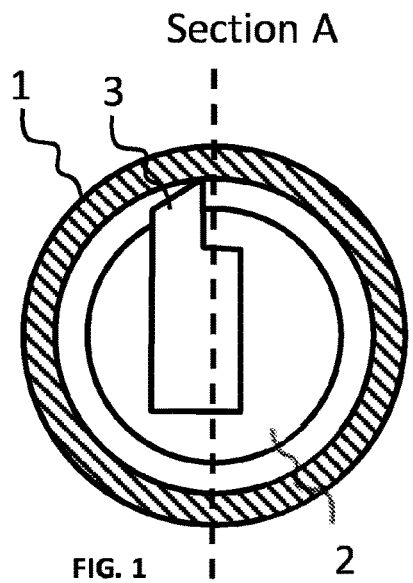
FIG. 1
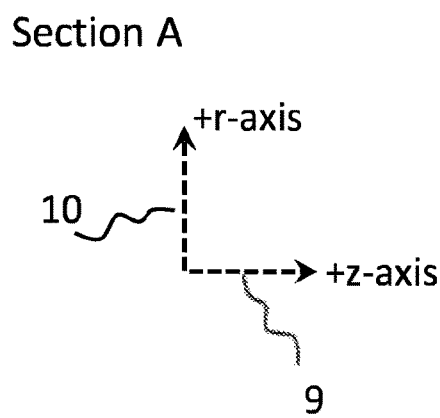
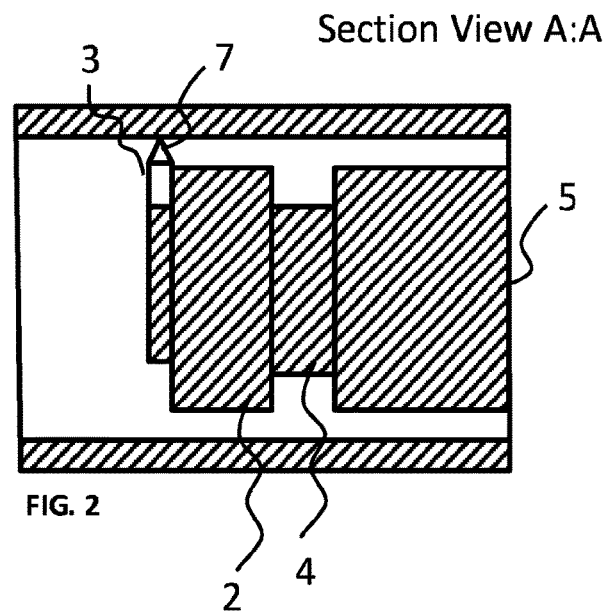
FIG. 2
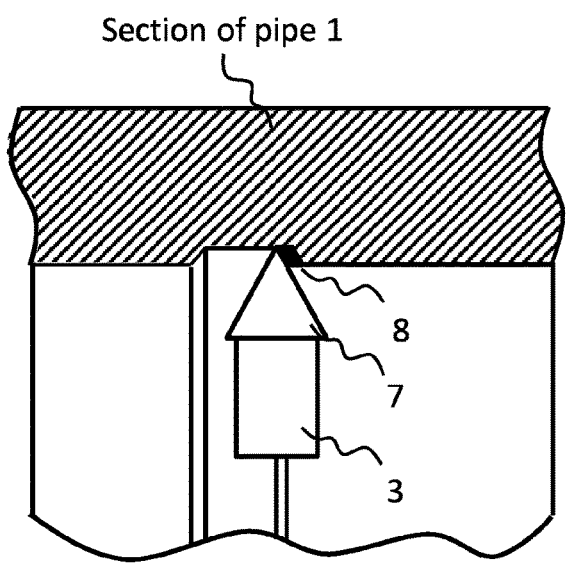
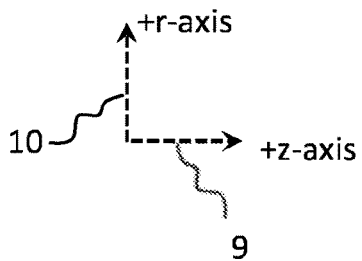
FIG. 3

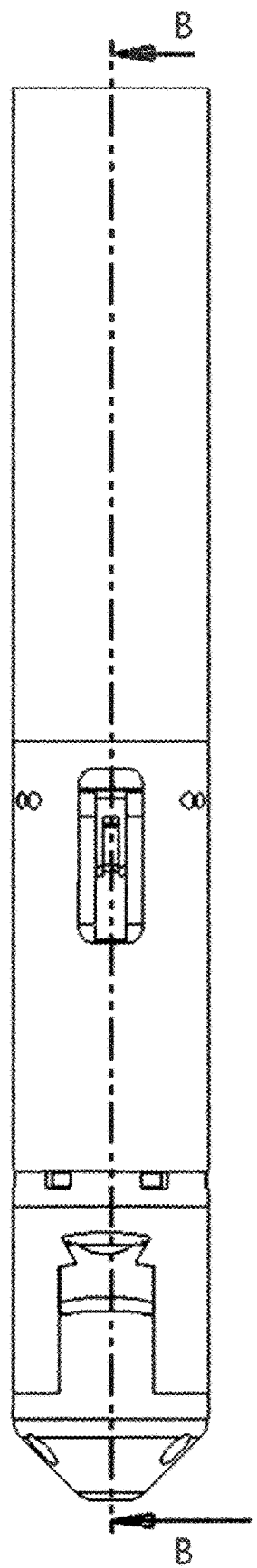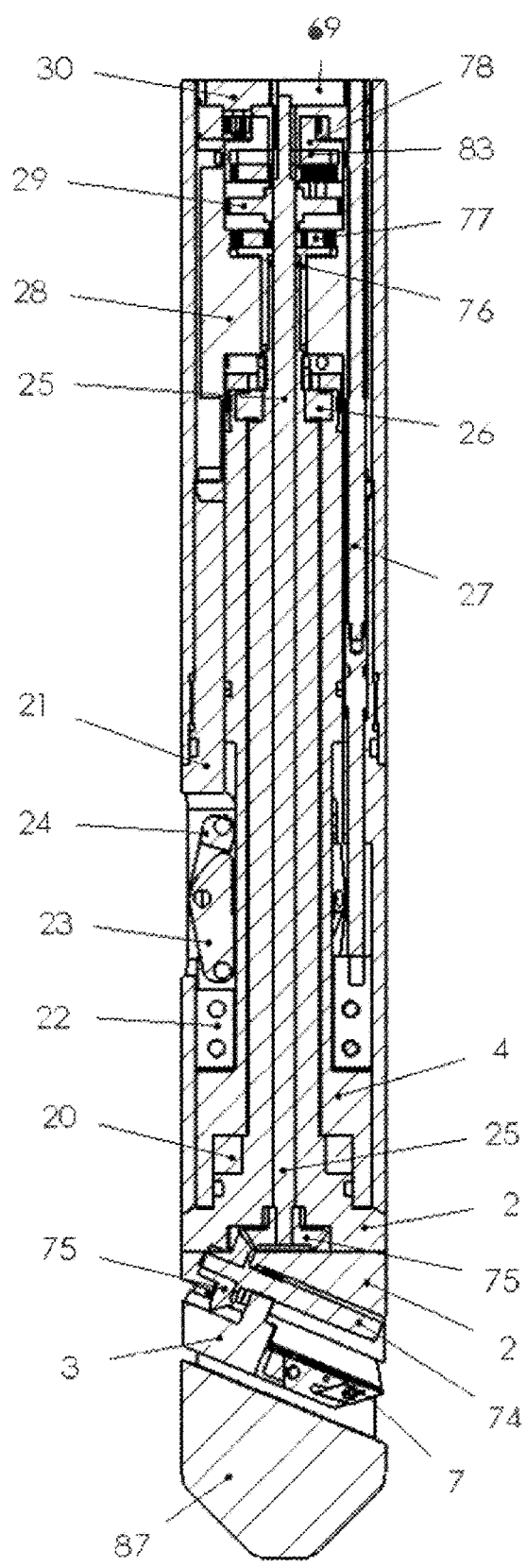
FIG. 19
SECTION B-B

PIPE CUTTING APPARATUS

CROSS-REFERENCE TO RELATED APPLICATIONS

The present application is a national phase application of International Patent Application No. PCT/GB2020/050310, filed on Feb. 11, 2020, which claims priority to Great Britain Patent Application No. 1901894.4, filed on Feb. 11, 2019, entitled "PIPE CUTTING APPARATUS," the disclosures of which are hereby incorporated by reference in their entireties.

The present disclosure relates to apparatus for cutting pipe. The present disclosure is particularly suited, but not limited to, oil field applications where there is often a need to cut pipe from the inside.

BACKGROUND

There are circumstances where it is desirable to cut a tubular pipe from inside using a battery powered cutting tool run into the pipe. A common application of this type of tool is in oil and gas wells where it is desirable to run a tool into the well to a certain depth and cut the tubing the tool is inside.

There are a number of established methods for cutting from inside a pipe in oil and gas wells. There are various mechanical cutters that are operated by hydraulic or electrical power supplied from the surface; a disadvantage with these established methods is the need to supply power through electric line or hydraulic line. The other established methods for cutting from inside pipe involve the use of pyrotechnic or chemical cutters that take the power they require with them in a chemical form, simplifying deployment into the well, but they are hazardous to ship and operate.

Many mechanical internal pipe cutting tools use a cutting bit that is rotated in the pipe and advanced outward to machine a groove of rectangular section in the pipe. Early examples of such tools can be found in U.S. Pat. Nos. 1,358,818, 3,859,877. Modern tools still use derivatives of this cutting method, for example US2007/0131410 & US2011/0297379 site tools using this technique. Typically, prior art mechanical internal pipe cutting tools, powered by electricity, have relatively large electrical power requirements.

US2008/0236828A1 cites a cutting tool using a rotating saw blade that is advanced outward and rotated in the pipe to produce a rectangular section cut.

A relatively modern cutting mechanism is disclosed in US2014/0124191 which is a tool using multiple arms the swing out on a hinge with a cutting blade at the extent of each arm.

It is in this context that the present disclosure has been conceived.

BRIEF SUMMARY OF THE DISCLOSURE

In accordance with the present disclosure there is provided an apparatus comprising a low-power cutting tool for insertion into a pipe and configured to remove material from an internal surface of the pipe. The cutting tool comprises: a housing for insertion within the pipe; a cutting head extending from the housing and comprising a cutting tip for machining the internal surface of the pipe in a machining operation when the cutting tool is inserted into the pipe; and one or more actuators for driving the cutting tip during the machining operation. The apparatus further comprises one or more processors; and a computer-readable memory storing instructions which, when executed by the one or more processors: control the one or more actuators to cause the cutting tip to machine the internal surface of the pipe to remove material therefrom in the machining operation, such that the cutting tool is maintained in a low-power configuration.

The term "low-power" will be understood to be distinguished from a cutting tool which is not low-power. In other words, the cutting tool is arranged to be operated such that the power consumption is controlled to be low-power. Thus, the apparatus provides for electrically-powered cutting tools for removing material from the internal surface of pipes, for example for cutting operations, which can be supplied through low-power electricity supplies. The electricity supply may be a battery, which may be comprised in the cutting tool, in which case it will be appreciated that only a relatively small size of battery would be required to support a relatively low instantaneous power consumption of the cutting tool. Of course, the electricity supply may be via a electrical power supply located separately from the cutting tool, for example outside the pipe. It will be understood that a low power electrical power supply will typically be of lower cost and smaller size than the higher power electrical power supplies required in the prior art.

It will be understood that the one or more processors and the memory may be comprised in the low-power cutting tool. Alternatively, the one or more processors and the memory may be provided separate from the cutting tool, though in data communication therewith.

The machining operation may be referred to as a cutting operation, even if the pipe is not completely severed.

The cutting tool may be a downhole tool. In other words, the cutting tool may be arranged to be inserted into a downhole pipe, for example an oil and gas well.

The term actuator will be understood to be a component that causes movement of another component of the system. The actuator of the one or more actuators is typically an electrical actuator. For the avoidance of doubt, it is noted that an electric motor is considered to be an actuator.

In the low-power configuration, an operational parameter of the one or more actuators may be controlled to maintain the cutting tool in the low-power configuration. In other words, the movement of the cutting tool during the machining operation can be controlled to ensure that the cutting tool continually operates in the low-power configuration. For example, the cutting tool can be configured to take small enough cuts into the internal surface of the pipe so as to control the load on the one or more actuators to be within an acceptable power range. It will be understood that an operational parameter of the one or more actuators is substantially any controllable parameter that affects the operation of one or more of the one or more actuators. In one example, the operational parameter may include one or more of position, movement speed, torque, acceleration, power consumption, current draw and voltage.

The operational parameter may be indicative of an electrical power requirement of the one or more actuators driving the cutting tip. Thus, the one or more actuators can be controlled such that an electrical power requirement of the one or more actuators is such that the cutting tool is maintained in the low-power configuration. The electrical power requirement may be controlled not to exceed a predetermined electrical power threshold of less than 300 watts. The electrical power requirement may be controlled not to exceed a predetermined electrical power threshold of less than 200 watts. The electrical power requirement may be controlled not to exceed a predetermined electrical power threshold of less than 150 watts. The electrical power requirement may be controlled not to exceed a predetermined electrical power threshold of less than 100 watts. Thus, the total electrical power requirement of the one or more actuators together may be limited so as to ensure that the tool operates in the low-power configuration, to enable the benefits described hereinbefore.

The operational parameter may be indicative of a movement of the cutting tip. Thus, the movement of the cutting tip may be controlled to maintain the cutting tool in the low-power configuration.

The cutting tip may be a pointed cutting tip. In other words, the cutting tip substantially narrows to a point when viewed along the circumferential direction (in a plane parallel to the radial direction from the housing to the cutting tip and the longitudinal direction of the housing). It will be understood that as the cutting tip is depressed into the internal surface of the pipe, one or more sides of the cutting tip, extending away from the point of the cutting tip, will also contact material of the pipe, thereby cutting the contacted material away. In some examples, both sides of the cutting tip may be used to remove material for at least a portion of the machining operation. In other examples, only one side of the cutting tip may be used to remove material during the machining operation. The cutting tip may be substantially symmetrical in the region of the cutting point and the cutting sides.

It will be understood that the cutting point may not be a sharp point when viewed microscopically but may, in practice, comprise a rounded point of a small size.

An angle between the radial direction extending to the cutting tip transverse to the longitudinal direction of the housing and a side of the cutting tip may be less than 40 degrees. The angle may be less than 30 degrees. The angle may be less than 20 degrees. For a cutting tip that is substantially symmetric, it will be understood that the angle between the sides of the cutting tip is double the angle described hereinbefore.

The operational parameter may be indicative of a cutting width of the cutting tip during the machining operation. It will be understood that the cutting width of the cutting tip is the length of the cutting tip, from the cutting point along either side of the cutting tip, which is configured to come into contact with the material of the inner surface of the pipe during the cutting operation for removal of the material. Where both sides of the cutting tip are used for removing material, the cutting width is typically the same for both sides of the cutting tip. Most of the time, only a single side of the cutting tip is used for removing material. Thus, the low-power configuration of the cutting tool can be maintained by controlling an operational parameter indicative of the cutting width. Of course, it will be appreciated that a larger cutting width will typically require greater power to the cutting tool.

The cutting width of the cutting tip may be controlled to be less than a predetermined cutting width threshold during the machining operation. The predetermined cutting width threshold may be less than 1 millimetre. The predetermined cutting width threshold may be less than 0.5 millimetres. The predetermined cutting width threshold may be less than 0.3 millimetres. The predetermined cutting width threshold may be less than 0.1 millimetres. The predetermined cutting width threshold may be less than 0.05 millimetres. The cutting width of the cutting tip may be controlled to be less than the predetermined cutting width threshold at all times during the machining operation. Thus, the low-power configuration of the cutting tool can be maintained by ensuring only a relatively small amount of material is removed in a given unit time.

The operational parameter may be indicative of a cutting depth of the cutting tip during the machining operation. It will be understood that the cutting depth is a distance of the material to be removed from the internal surface of the pipe in a single pass of the cutting tip over a given circumferential position on the internal surface of the pipe, the distance being in a direction substantially perpendicular to the cutting side of the cutting tip and in a plane parallel to the radial direction from the housing to the cutting point and the longitudinal direction of the housing. In other words, the cutting depth is indicative of the thickness of the material to be removed as the cutting tip is moved against the internal surface of the pipe. Together, the cutting depth and the cutting width define a cross-sectional area of a cutting chip of material to be removed from the internal surface of the pipe. Of course, a larger cutting depth will require removal of more material, and will increase the power requirements of the cutting tool. Furthermore, it will be appreciated that the cutting depth may be varied during the machining operation as necessary.

The operational parameter may be indicative of a speed of revolution of the cutting tip in the pipe. Given the cutting depth, the cutting width, the radius of the internal surface of the pipe, and the speed of revolution of the cutting tip in the pipe, a volumetric cutting rate for the material can be determined. Any of these parameters can be altered to change the volumetric cutting rate to affect the power requirement of the cutting tool, therefore enabling the cutting tool to operate in the low-power configuration. Where the power consumption is too high, this can be reduced. Similarly, where the power consumption is particularly low, the parameters can be altered to increase the volumetric cutting rate to increase the power requirement of the cutting tool to be closer to any power consumption threshold.

The cutting head may be configured such that a maximum of only (or exactly) one cutting tip is in contact with the internal surface of the pipe at any one time during the machining operation. The cutting head may comprise exactly one cutting tip. Substantially all of the material removed from the internal surface of the pipe during the machining operation may be removed using the exactly one cutting tip. In other words, the cutting head comprises only one cutting tip and does not comprise a plurality of cutting tips. If multiple cutting tips were in contact with the internal surface of the pipe, this would increase the friction between the internal surface and the cutting tips as well as resulting in an increase in the volumetric cutting rate, which would increase the electrical power consumption of the cutting tool, potentially taking the cutting tool out of the low-power configuration. A cutting tool with only one cutting tip is therefore arranged to be run using a lower power.

This in itself is believed to be novel and so the present disclosure also provides an apparatus comprising a low-power cutting tool for insertion into a pipe and configured to remove material from an internal surface of the pipe. The cutting tool comprises: a housing for insertion within the pipe; a cutting head extending from the housing and comprising a cutting tip for machining the internal surface of the pipe in a machining operation when the cutting tool is inserted into the pipe; and one or more actuators for driving the cutting tip during the machining operation. The apparatus further comprises one or more processors; and a computer-readable memory storing instructions which, when executed by the one or more processors: control the one or more actuators to cause the cutting tip to machine the internal surface of the pipe to remove material therefrom in the machining operation such that a maximum of one cutting tip is in contact with the internal surface of the pipe during the machining operation.

The instructions stored by the memory, when executed by the one or more processors, may determine a machining path relative to the internal surface of the pipe for carrying out the machining operation. The instructions stored by the memory, when executed by the one or more processors, may cause the cutting tip to follow the machining path in the machining operation. Thus, the cutting tool can automatically perform the required machining operation.

It will be understood that the machining path may be determined prior to removal of any material in the machining operation. In other examples, the machining path may be partly determined and/or refined after removal of a portion of material in the machining operation. In other words, the machining path may be determined or updated in dependence on one or more machining characteristics determined during an initial portion of the machining operation. The machining path may be determined in dependence on a consumption characteristic indicative of an electrical power consumption of the one or more actuators. Thus, it will be understood that the machining path may be updated in order to ensure that the cutting tool is maintained in the low-power configuration.

The machining path may define at least one parameter representative of a speed of movement of the cutting tip. It will be understood that the speed of movement may be a time-based parameter, such as the distance travelled by the cutting tip relative to the internal surface of the pipe in a unit time (e.g., a second). Alternatively, the speed of movement may be a revolution-based parameter, such as the distance travelled by the cutting tip relative to the internal surface of the pipe in a unit measure of a revolution of the cutting tip in a circumferential direction about the longitudinal axis of the cutting tool. Thus, the speed of movement of the tip can be set as part of the machining path in order to control the power consumption of the cutting tool so as to maintain the cutting tool in a low-power configuration.

The machining path may be defined such that the cutting width of the cutting tip substantially never exceeds a default cutting width of the cutting tip. The default cutting width may be an extent of the cutting tip in contact with the internal surface of the pipe during at least 50 percent of the machining operation. The default cutting width may be an extent of the cutting tip in contact with the internal surface of the pipe during at least 70 percent of the machining operation. Thus, the machining path is arranged to ensure that material can be removed from the internal surface of the pipe in the machining operation without any significant power consumption spikes above a default power consumption level, for example caused by radial extension of the cutting tip into the internal surface of the pipe without sufficient separation between the boundary of the internal surface of the pipe adjacent the region to be machined and the cutting tip. It will be understood that without sufficient separation, more of the cutting width will be in contact with the internal surface at the boundary of the region to be machined that during the machining operation away from the boundary of the region. The increase in the effective cutting width may increase a power consumption of the cutting tool, which may disadvantageously prevent the tool being maintained in a low-power configuration.

The machining path may be to cause the cutting tip to move into the internal surface of the pipe in an incline direction having a component in a longitudinal direction along the pipe. Thus, movement of the cutting tip in the incline direction can remove material in both a radial direction and a longitudinal direction of the internal surface of the pipe. The incline direction may make an angle of at least 10 degrees to a radial direction transverse to the longitudinal direction and radially outwards from the housing to the internal surface of the pipe. The incline direction may make an angle of at least 30 degrees to a radial direction transverse to the longitudinal direction and radially outwards from the housing to the internal surface of the pipe. The incline direction may be greater than the angle of the side of the cutting tip. Thus, it is possible to maintain clearance between the cutting tip and the region of the internal surface of the pipe adjacent the region to be machined, to ensure the cutting tool is maintained in the low-power configuration.

The machining path may comprise a first portion configured to cause the cutting tip to remove a first volume of material extending around a whole circumference of the pipe. The machining path may further comprise a second portion after the first portion and configured to cause the cutting tip to remove a second volume of material, bordering the first volume of material. The machining path may further comprise a third portion arranged between the first portion and the second portion and in which no material is removed from the internal surface of the pipe. Thus, the internal surface of the pipe can be machined in a plurality of portions, sometimes referred to as layers. Typically, to begin machining a new layer, it is necessary to move the cutting tip from the end position of the previous layer to the start position of the next layer. For at least part of the movement of the cutting tip from the end position of the previous layer to the start position of the next layer, the cutting tip is not in contact with the internal surface and so no material is removed from the internal surface. As used herein, the first portion and the second portion each relate to a volume of the pipe having a substantially cylindrical annulus or conical annulus shape.

The one or more actuators may be a plurality of actuators comprising a first actuator and a second actuator. During the first portion and the second portion, the first actuator may be configured to cause the cutting tip to rotate about a longitudinal axis of the pipe to remove material from the whole circumference of the pipe. During the first portion and the second portion, the second actuator may be configured to cause the cutting tip to move in a cutting direction having at least a component in a longitudinal direction along the pipe. The first actuator may be an electric motor.

The plurality of actuators may comprise a third actuator. Between the first portion and the second portion of the machining path, the third actuator may be configured to at least partially cause the cutting tip to move between the first portion and the second portion. Thus, apparatus having three actuators in the cutting tool is disclosed, where the three actuators can be used in combination to perform the machining operation.

The third actuator may be configured to cause the cutting tip to move in a longitudinal direction along the pipe. Alternatively, the third actuator may be configured to cause the cutting tip to move in the radial direction between the cutting tool and the internal surface of the pipe. Where the third actuator is configured to cause the cutting tip to move in the radial direction, the second actuator may be configured to cause the cutting tip to move in a cutting direction defined substantially completely in the longitudinal direction.

The machining operation may be to cause the apparatus to cut entirely through the internal surface of the pipe to an external surface of the pipe. Thus, the cutting tool may be a tool for completely cutting pipe. Of course, in other alternatively or additionally, the cutting tool can be used to otherwise machine the internal surface of the pipe without penetrating fully through the wall of the pipe, for example to dress the internal surface of the pipe for a further operation in the pipe and/or to the internal surface of the pipe.

The one or more actuators may be arranged to cause the cutting tip to machine the internal surface of the pipe to remove material therefrom in the machining operation without movement of the housing in a longitudinal direction along the pipe. Thus, the housing can remain substantially fixed in the machining location in the pipe and the cutting head can be maneuvered appropriately relative to the housing to perform the machining operation.

The instructions stored by the memory, when executed by the one or more processors, may determine a position of the cutting tip in dependence on an electricity metric indicative of a current draw of at least one of the one or more actuators. The instructions stored by the memory, when executed by the one or more processors, may determine a first contact between the cutting tip and the internal surface of the pipe in dependence on an electricity metric indicative of a current draw of at least one of the one or more actuators. Thus, an increased mechanical resistance caused by contact of the cutting tip with the internal surface of the pipe may be detected by monitoring the current drawn of the one or more actuators and can be used to determine a future position of cutting tip relative to the internal surface of the pipe.

The instructions stored by the memory, when executed by the one or more processors, may determine that the cutting tip is in a cut-through configuration in dependence on an electricity metric indicative of a current draw of at least one of the one or more actuators. Thus, a reduced mechanical resistance caused by ceasing of contact between the cutting tip and the internal surface of the pipe may be detected by monitoring the current drawn of the one or more actuators and can be used to determine that the cutting tip has fully cut through the wall of the pipe. A pipe thickness can also be determined in dependence on a relative spacing between the radial position in which the cutting tip is determined to be in a cut-through configuration and the radial position of the first contact between the cutting tip and the internal surface of the pipe.

The cutting tool may further comprise a deployable anchor for securing the cutting tool at a machining position within the pipe. The deployable anchor may be a plurality of deployable anchors arranged to stabilise the cutting tool at the machining position. The deployable anchors may be arranged to substantially centralize the cutting tool in the pipe. At least one of the plurality of deployable anchors may be arranged to be provided within 30 centimetres of the cutting tip in the longitudinal direction of the housing. It will be understood that such an arrangement ensures that the cutting tool is secured effectively at the machining position during the machining operation.

The cutting tool may comprise a frangible portion between the housing and the cutting tip, such that the cutting tip can be broken away from the cutting tool. Thus, if the cutting tip stalls in the pipe during a machining operation, the cutting tip can be easily broken off from the rest of the cutting tool to enable removal of the rest of the cutting tool from the pipe. It will be appreciated that removal of the cutting tool in such situations is at least partly enabled because the machining forces applied by the cutting tip are limited due to the requirement that the cutting tool is operated in the low-power configuration. Accordingly, the frangible portion can be configured to break at a lower force than would otherwise be needed in a high-power cutting tool without risk that the cutting tip would break from the rest of the cutting tool at the frangible portion in normal operation.

At least one of the one or more actuators may be a motor. The motor may be configured to cause the cutting head to be rotated about a longitudinal axis of the housing, to be substantially aligned with a longitudinal axis of the pipe, to cause the cutting tip to machine the internal surface of the pipe.

The pipe is typically a substantially cylindrical pipe. In other words, the pipe has a substantially circular cross-section.

The cutting tip may be connected to the housing via a cutting arm, also comprised in the cutting head.

The one or more processors may be any suitable data processor for performing calculations and sending control signals to other components of the cutting tool. The computer-readable memory may be substantially any non-transitory computer-readable storage medium of the type which is readable by the one or more processors for extracting instructions stored thereon. The computer-readable memory may also be used to store parameters for use by the one or more processors for performing the instructions.

The presently described apparatus is low power through the use of a slower and more efficient mechanical cutting method. This method takes the power consumption significantly below that of established electro-mechanical methods and so enables a cutting tool that can be powered from commonly available batteries, especially batteries suitable for deployment at the elevated temperatures of oil and gas wells.

According to one aspect of the disclosure there is provided a method for cutting a groove from inside a pipe using a pointed cutting tip that is rotated concentrically in the pipe while being extended radially and moved in the longitudinal axis of the pipe.

The cutting point of the cutting tip is typically formed from the point of a triangular or the acute point of a diamond shaped cutting tip with a small radius at the point, typically 0.1 mm to 1 mm. Preferably, the cutting method is implemented with a cutting tip angle as acute as practicable consistent with mechanical strength of the cutting tip; a tip angle of 60 deg or less is considered very practicable and an angle of less than 40 deg is practicable.

Preferably, the method is used to cut a groove in the pipe that will optionally sever the pipe. Optionally, the method may be used to dress the inner surface of the pipe or clean the inner surface of the pipe.

Optionally, the cutting method adjusts the speed of cutting tip rotation, or width of cut, or the depth of cut, or any combination of these, to keep the power or current consumption below a maximum value.

The cutting method and the use of a pointed tip enables the cutting depth and width taken from the pipe to be small; small being preferably less than 0.3 mm, more preferably less than 0.1 mm and in some circumstances less than 0.05 mm.

Preferably, the start position of the cut is detected by advancing the rotating cutting tip in the radial direction until fluctuation or increase in load is detected that indicates the cutting tip has reached the inside diameter of the pipe. Optionally, the load is determined by measurement of the current drawn by the electric motor powering the rotation of the cutting tip in the pipe. Alternatively, the method might use a predetermined start position. Optionally, a combination of predetermined start position and detected start position could be used.

Having moved the cutting tip to the start position of the cut there are two variants of the cutting method that may be used to progressively cut the groove in the pipe.

The first cutting method (cut method 1) is to sweep the rotating cutting tip back and forward in the longitudinal axis of the pipe, progressively extending the cutting tip in the radial direction, and shortening the length of each sweep so that the flanks of the pointed cutting tip do not cut or rub the edges of the groove at the end of the sweeps. Preferably, the cutting tip is advanced in the radial direction at the start of each sweep so the tip cuts while sweeping in each direction; alternatively the cutting tip may be advanced radially only at one end of the groove so it only cuts sweeping in one direction; alternatively the cutting tip may be advanced slowly but continually throughout the sweep. Optionally, the length of the longitudinal sweep is shortened sufficiently each stroke to produce a groove that provides cutting clearance between cutting tip edge and groove edge at each end of the longitudinal sweep.

The second cutting method (cut method 2) is to sweep the rotating cutting tip back and forward along a radial trajectory; the tip is first swept outward in the radial trajectory (forward stroke) shaving a cutting from the pipe as it rotates, the tip is then withdrawn (withdrawal stroke), before being advanced in the longitudinal axis, after which, another forward stroke may be made in the radial trajectory to shave another cutting. Each forward stroke in the radial trajectory is increased in length progressively forming a groove in the pipe which is nominally triangular. Optionally, the chosen radial trajectory will provide cutting clearance between the edge of the cutting tip and the edge of the groove being formed in the pipe that is closest to the radial trajectory; also, there may optionally be provided a cutting clearance between the other edge of the cutting tip and the other edge of the groove, implemented through the control of the length of the cut in the radial trajectory.

An option in cut method 2 is for the cutting tip to be advanced in the longitudinal axis at the end of the forward stroke, in which case it cuts in both directions of the radial movement.

The preferred cutting clearance in any form of the methods is in the range of 5 to 10 degrees. However, cutting clearance could be optionally increased on one or both sides of the cutting tip to improve performance when cutting pipe that is in compression. Optionally, the groove shape may be deviated from its typically triangular form to assist in performance when cutting pipe that is in compression. When cutting pipe in compression it may be preferable to use cut method 2 with a radial trajectory arranged to cut towards the cutting tool. Optionally, any of the cutting methods might include a sub cutting method intended to clean out the narrowest part of the groove in the pipe to assist with deformation resulting from the pipe being in compression.

Optionally, any of the disclosed cutting methods can include lifting the cutting tip from the surface being cut periodically throughout the cut, preferably while maintaining rotation and preferably pausing advancement of the tip in the cutting axis; this can assist in chip breaking.

Preferably, when not cutting, the cutting method will stow the cutting arm in the cutting head and pull the cutting head tight against the tool body to assist in protecting the cutting head bearings from impact shock.

According to another aspect of the disclosure there is provided an internal pipe cutting tool comprising; a mechanism to anchor the tool in the pipe; a rotating cutting head that can be moved to a position disposed from the cutting tool in the longitudinal axis; and a pointed cutting tip mounted on a cutting arm that is mounted on the rotating cutting head such that the cutting arm and cutting tip can be moved in a radial direction relative to the cutting head.

Optionally, the cutting tool, or valid variants thereof, can implement any valid combination of the aspects of the cutting method disclosed in this specification.

Any mechanism of anchoring the cutting tool that holds it firmly in the centre of the pipe may be used. Preferably, the anchors provide a centralising mechanism proximate to the cutting head and at the distal end from the cutter. Preferably the anchors comprise a group of three arms that are driven radially out from the cutting tool to clamp it in the pipe. Preferably, the arms are driven out into the clamping position through the use of rods to convey the mechanical effort from the anchor drive mechanism. Preferably the rods are pulled in tension to force the anchor arms outward. Alternatively, a motor and hydraulic pump could be used to provide pressurised fluid to slave hydraulic cylinders, proximate to the distal sets of anchors, to deploy the anchors.

Preferably, the cutting tool has a releasing mechanism to release the anchors. Optionally, the releasing mechanism is activated by shearing shear pins. Optionally, the release mechanism will disconnect power to the cutting tool when released. Optionally, the release mechanism is pressure balanced.

The rotating cutting head runs in bearings mounted in a quill that can be extended longitudinally from the fixed body sometimes referred to as the housing of the cutting tool. Preferably, a taper is provided on the back of the cutting head that engages with a tapper on the housing such that when the quill is fully withdrawn the cutting head rests in the tapper.

The cutting arm could be mounted to the cutting head on a slide way, which is typically a tight dovetail slide way, although any form of slide that confines the cutting arm movement to one axis can be used. Optionally, the cutting arm can slide in the cutting head at a compound angle between longitudinal axis and radial axis. Optionally, the compound angle is chosen to provide cutting clearance on one side of the cutting tip, the preferred cutting clearance being in the range of 5 to 10 degrees. Alternatively, the cutting arm may be mounted on a pivot in the cutting head rather than a slide such that the pivoting cutting arm swings in an arc in the radial direction away from the cutting head. Optionally, the angle the cutting tip is mounted to the pivoted cutting arm may be adjusted to select the cutting clearance on the side of the groove furthest from the pivot point, the preferred cutting clearance being in the range of 5 to 10 degrees. Optionally, the cutting clearance provided by the physical arrangement of the arm may be increased beyond 10 degrees to assist with pipe creep.

Preferably, the cutting arm movement in its slide way or about its pivot point is controlled independently, preferably by dedicated electrical motor and gear arrangement. This dedicated electrical motor may be mounted in the non-rotating area of the cutting tool and coupled to the cutting arm movement on the rotating cutting head by mechanical gear arrangement. Optionally, the mechanical gear arrangement would be a planetary arrangement. Alternatively, the dedicated electrical motor and gear arrangement controlling the cutting arm movement would be mounted in the rotating cutting head and electrically connected to the non-rotating area of the cutting tool through electrical slip rings. In this arrangement motor control electronics may be located in the rotating cutting head proximate to the motor, alternatively all motor wiring and any other electrical sensors in the cutting head could be wired through multiple electrical slip rings to controlling electronics located in the non-rotating part of the cutting tool.

Preferably, the quill of the cutting tool is moved independently in the longitudinal axis by a dedicated motor and appropriate quill drive mechanism. Preferably, the motor and quill drive mechanism is mounted in the fixed body of the cutting tool and acts on the quill; alternatively it can be mounted in the moving quill and act against the fixed body of the cutting tool; yet again, parts of it may be in the quill and parts in the fixed body of the cutting tool.

Preferably, the quill drive mechanism comprises reduction gears driving a linear drive mechanism. Preferably, the linear drive mechanism is a leadscrew arrangement with ball or roller type bearings, optionally a plain bearing can be used and optionally the leadscrew may be replaced by a ball screw arrangement. Alternatively, a rack and pinion linear drive can be used. Optionally, the linear drive mechanism may be coupled to the quill or to the fixed body of the cutting tool, or both, through longitudinal push rods that allow the drive mechanism to be distal from one or both of the bodies it acts on.

The electrical motors used in the cutting tool may be any form of motor. Preferably, the motors are brushless. Preferably, the motors used to control the cutting arm movement or the quill drive would provide indexing of movement to assist in position measurement, preferably these motors are stepper, synchronous or brushless DC type. Optionally, a separate movement encoder may be used on any of the axis movements; typically this would be a quadrature encoder.

Preferably, the cutting tool is oil filled and the oil is pressure balanced to the external tool pressure. Preferably, this pressure balancing is achieved with a moving compensation piston. Typically, low friction seals are used in this compensator, PTFE being a preferable choice of material.

The apparatus may be powered from an external battery pack or alternatively a wireline supply from outside the pipe.

Optionally, an additional chip breaker may be mounted, for example bolted, to the cutting arm. Typically, there is provided a weak point in the cutting arm in the longitudinal axis.

BRIEF DESCRIPTION OF THE DRAWINGS

Embodiments of the disclosure are further described hereinafter with reference to the accompanying drawings, in which:

FIG. 1 illustrates a simplified end view of the disclosed cutting tool in a pipe;

FIG. 2 illustrates a simplified section view from FIG. 1 of the disclosed cutting tool identifying the key moving sections of the tool;

FIG. 3 illustrates the start of a cut in the pipe wall;

FIG. 19 shows a section view of the lower anchor, quill and cutting head assembly;

DETAILED DESCRIPTION

Cutting Method

Figure 4:
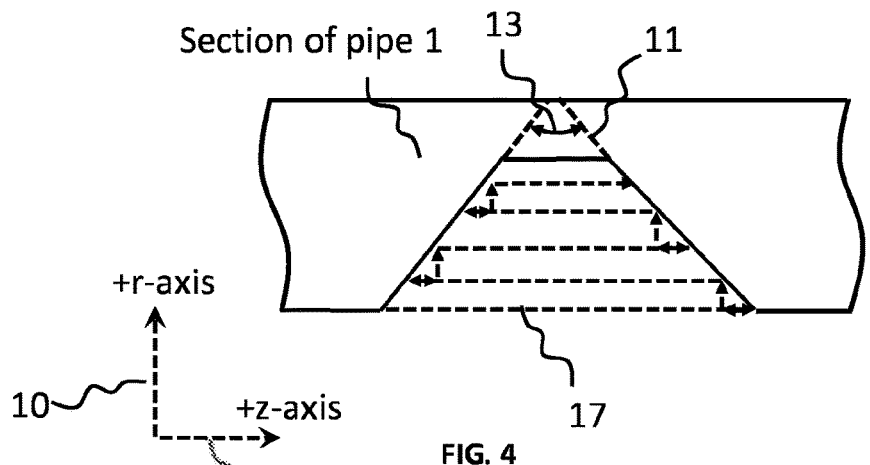
FIG. 4 illustrates the cut method 1 cutting tip trajectory in 2D.

A significant concept disclosed herein for internal pipe cutting is the use of a pointed cutting tip that is moved in multiple axes so that it always cuts a small area at the tip of the cutter. The small area of cut helps restrict the power consumed by the cutter which helps design a cutter for battery operation.

It is not practical to make a small (<0.5 mm) cutting tip that can be driven all the way through the pipe wall. To cut through the pipe, while only shaving a small cutting off the pipe, requires that the cutting tip not only be rotated concentric within the pipe and moved radially outward (r-axis) but that the tip be moved in the long axis (z-axis). Moving the cutting tip in multiple axes allows a groove to be steadily machined in the pipe, ultimately severing the pipe, without requiring significant power to shave a large cutting from the pipe at any point.

FIGS. 1 & 2 illustrate a simple view of a tool capable of implementing the cutting method for the purpose of further disclosing the method and some key characteristics of the cutting tool. FIG. 1 shows the end view of the pipe (1) with the end of the cutting head (2) and cutting arm (3). FIG. 2 shows the same elements as section AA of FIG. 1, but also reveals the neck or quill (4) of the tool that allows the cutting head(2) to be moved in the z-axis relative to the main body (5) of the tool.

The details of the drive mechanisms, motors, gearboxes, slides, etcetera, are not show at this point in the specification for clarity of the method. More detailed implementation of apparatus capable of implementing the method is given later in this specification.

The implementation requires a means for the controlling electronics in the tool to know the distance the cutting head (2) has been deployed in the z-axis relative to the tool and the distance the cutting arm (3) has been extended in the radial direction. This may be achieved with stepper motors, brushless motors and/or the use of any of the established forms of rotary or linear encoding techniques. It should also be appreciated that the control electronics needs to know the speed of rotation of the cutting head (2) to correctly control the relative speed of the other two axis feeds.

Referring to FIG. 1 we see the end of the cutting head (2) with the cutting arm (3) extended to just contact the inside of the pipe at the start of a cut. This diagram shows an implementation with a clockwise direction of cut as viewed. The arm (3) is normally held in the stowed position within the circumference of the cutting head when the tool is being moved into and out of a pipe to avoid damage to the tool and the pipe and also avoid the tool becoming stuck.

During the cutting operation the cutting head (2) rotates the cutting arm (3) and cutting tip (7) concentric within the pipe such that when advanced radially the cutting arm (3) drives the cutting tip (7) into the pipe causing the cutting tip to shave a strip from the inside of the pipe as it rotates. It should be apparent that the tool body (5) needs to be firmly anchored in the pipe to resist the reaction forces from the cutting process.

With the tool anchored in the pipe the cutting head (2) rotation is started with the arm (3) still stowed within the circumference of the tool. The control electronics will firstly determine the steady state load of the rotating cutting head (2) while not cutting. Having established steady state load the control electronics will then slowly advance the arm (3) in the positive radial direction (10) until either load fluctuations (eccentricity of cut) or a significant increase in load is detected; these events allow the electronics to recognise the cutting tip (7) has reached the inside diameter of the pipe.

The controlling electronics is able to detect the load on the cutting tip (7) through measurement of the motor current which is proportional to the torque on the cutting head. This allows the controlling electronics to detect the increase in load as the cutting arm is advanced to the position that cutting starts. The measure of load can also be used by the controlling electronics to adapt the size of the cut being taken to stay within the limited power or current available to the tool. The measurement of cutting tip load also allows the electronics to determine when the cutting tip has broken through the pipe in order for it to identify the end of cut event whereupon it can stop the rotation, return the cutting arm to the stowed position and retract the anchors.

FIG. 3 illustrates the cutting area (8) that can be considered to comprise of a cutting feed and a cutting advance. Cutting feed $\delta W$ is the distance the cutting tip is moved in the cutting movement (z-axis in FIG. 3) for one revolution of the cutting arm. Cutting advance $\delta D$ is the distance the tip is driven into the material being cut (r-axis in FIG. 3) each sweep along the cutting movement, which is typically perpendicular to the cutting movement.

The speed at which the cutting tip is advanced along the cutting movement is referred to as the cutting advance velocity (CAV). To achieve a particular cutting feed ($\delta W$) the required cutting advance velocity is dependent on the speed of the rotating cutting head. If RPS is the cutting head speed in revolutions per second and $\delta W$ is in millimetres, then cutting advance velocity CAV=RPS*$\delta W$ (mm/s).

The cutting torque should be approximately proportional to the area of the cutting being shaved from the pipe, thus torque is a function of both cutting feed $\delta W$ and cutting advance $\delta D$. Given that power is the product of torque and rotational speed this allows the method to select any one of, or any combination of, cutting feed, cutting advance and rotational speed to influence the current and power consumed by the tool in executing the cut.

Although the description hereinbefore has referred to cutting feed and cutting advance, it will be understood that the cutting area (8) can also be defined in terms of the cutting width as the length of the cutting tip, from the cutting point along either side of the cutting tip, which is configured to come into contact with the material of the inner surface of the pipe during the cutting operation for removal of the material, and in terms of the cutting depth as a distance of the material to be removed from the internal surface of the pipe in a single pass of the cutting tip over a given circumferential position on the internal surface of the pipe, the distance being in a direction substantially perpendicular to the cutting side of the cutting tip and in a plane parallel to the radial direction from the housing to the cutting point and the longitudinal direction of the housing.

A first simple method operating in two orthogonal axes is now disclosed, this is followed by disclosure of an enhanced method that operates on any radial trajectory, typically a compound axis to the longitudinal and radial axis.

Cut Method 1

The first cutting method (cut method 1) is described as the movement of the cutting tip (7) in the longitudinal z-axis (9) and the r-axis (10) as illustrated in FIG. 3. Movement of the tip in these two axes while the cutting arm (3) is also being rotated concentric to the pipe will progressively cut a groove into the pipe wall (1).

FIG. 3 illustrates the cutting tip (7) part way through the first cutting stroke in cut method 1. The diagram is a simplified section that illustrates the tip being advanced in the +z-axis and shows the area (8) ahead of the tip which is the material that will be removed in the next revolution of the cutting head. The area (8) in FIG. 3 has the dimensions of cutting feed $\delta W$ in the z-axis and cutting advance $\delta D$ in the r-axis.

The start position for cut method 1 is where the tip is in the minimum z-axis (9) position and has been extended in the r-axis (10) to just reach the inside diameter of the pipe.

FIG. 4 illustrates the cutting movement of cut method 1 in a section view with dashed lines with arrow heads (17) indicating the repeating steps of the method with exaggerated cutting advance. The groove cut in the diagram (shown as solid line) is not complete but the dashed line (11) projects the groove indicating it will ultimately break through the pipe wall (1).

The following description of cut method 1 uses the following definitions: MDC is max advance of cut in the r-axis; TCD is the total cut advance in the r-axis, which begins at 0; $\theta$ is the angle (13) at the peak of the triangle being cut (11); β is the base width of the triangle being cut where β=MDC*2*tan(θ/2); δD is cut advance.

Cut method 1 comprises the following main steps from the start position:
1. First cut: Advance the cutting tip at the cutting advance velocity a distance of +β in the z-axis.
2. Return Clearance: Withdraw the cutting tip in the z-axis by (−δD*Tan(θ/2)).
3. Return Advance: Advance the tip in the r-axis by +δD and add this to TCD, the total cut advance.
4. Reverse Cut: Withdraw the tip at cutting advance velocity −(β−TCD*2*tan(θ/2)) distance in the z axis.
5. Forward Clearance: Advance in the z-axis by (+δD*Tan(θ/2)).
6. Forward Advance: Advance the tip in the r-axis by δD and add this to TCD, the total cut advance.
7. Forward Cut: Advance the tip at cutting advance velocity +(β−TCD*2*Tan(θ/2)) distance in the +z axis.
8. Repeat steps 2 through 7, breaking out as soon as an end of cut event occurs.

The end of cut event in cut method 1 could be generated by various tests or conditions which could include external commands. In cut method 1 the total cut advance (TCD) becoming greater than or equal to the maximum advance of cut (TCD>=MDC) should be one of the end of cut events because, unmodified this method cannot continue beyond this condition.

Optionally, the steps 2 and 3 in cut method 1 can be done in parallel. Optionally the steps 5 and 6 in cut method 1 can be done in parallel.

Optionally, cut method 1 could be modified to only cut in one direction. For example remove step 3 or remove step 6 that advance the cutting tip into the material. If only cutting in one direction it may be advantageous to lift the cutting tip from the surface by withdrawing a small amount in the −r-axis direction for the non-cutting stroke; it may also be advantageous to move the tip at a faster speed in the r-axis than the cutting advance velocity when not cutting.

Optionally, one or both the clearance steps in cut method 1 (steps 2 & 5) could be removed making the method slightly simpler to implement. A consequence of this change is that with a rapid advance of the cutting tip in the r-axis in the following cut advance step (steps 3 & 6) the tip would be expected to cut twice the cut advance on its flank adjacent the groove wall which would require increased torque. If this is a problem, for instance in a limited power application, it might be remedied with the use of a slower advance in the r-axis that takes two or more cutting head revolutions to execute.

Cut Method 2

Figure 5:
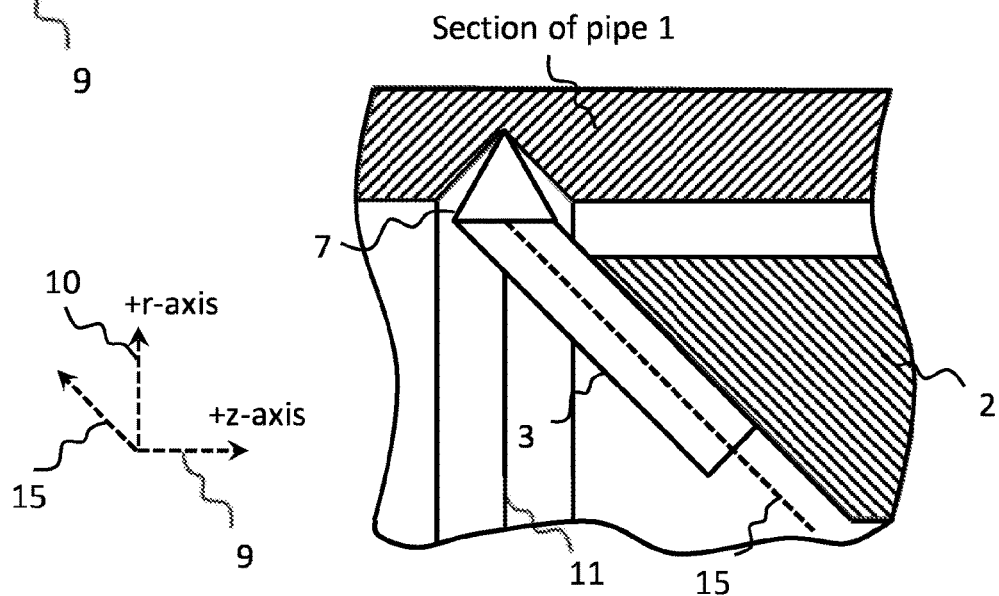
FIG. 5 illustrates cut method 2 groove forming using a cutting arm on a compound slide axis.

This method (cut method 2) is described by first defining a compound axis (15) that the cutting tip (7) moves in (cutting movement) that is inclined between the z-axis (9) and the radial axis (10). FIG. 5 illustrates the compound axis (15) that the cutting arm (3) now travels in the rotating cutting head (2).

Figure 6:
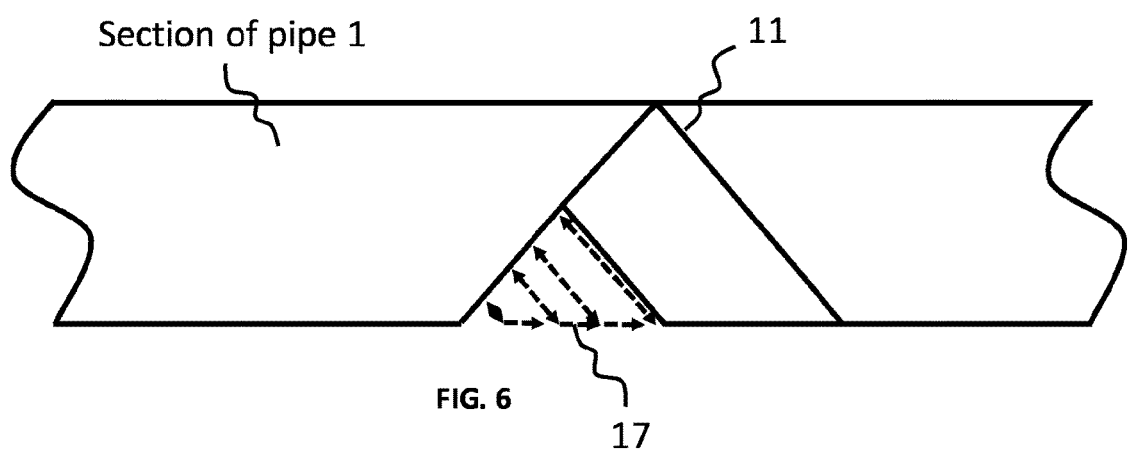
FIG. 6 illustrates cut method 2 cutting tip trajectory in 2D.

FIG. 6 illustrates the cut method 2 in simplified section view with dashed lines with arrow heads (17) indicating the cutting tip trajectory which illustrates the repeating steps of the method with exaggerated cutting advance.

Cut method 2 uses the following additional definition to the previous method: ZCL is the Z-axis cut length, a tally of the distance the cut has progressed in the z axis.

Cut method 2 can be implemented with the following main steps from the start position:
1. First Cut: Advance the cutting tip+δW distance in the +compound axis.
2. Withdrawal stroke: Withdraw the tip in the −compound axis direction to the start position.
3. Cut Advance: Advance the tip in the z-axis by (δD*sin(θ/2)) and add this value to ZCL, the tally of total z-axis cut length.
4. Cutting stroke: Advance the tip at cutting advance velocity +(ZCL/sin(θ/2)) distance in the compound axis.
5. Repeat steps 2 through 4, breaking out as soon as an end of cut event occurs.

The end of cut event in cut method 2 could be generated by various tests or conditions which could include external commands. One optional end of cut event would be (ZCL/2)*Tan(θ/2) becoming greater or equal to the maximum advance of cut (MDC), this allows a maximum cut advance to be preconfigured.

The withdrawal stroke (step 2) could be carried out at the cutting advance velocity, or any practical speed, but advantageously should be carried out as faster as practical to minimise total cutting time.

An enhancement of method 2 would be to lift the cutting tip away from the material being cut during the withdrawal stroke; this may allow a faster withdrawal speed. Alternatively, the cutting tip could be advanced into the material to cut on the withdrawal stroke, which could reduce total cutting time, however, with the resulting shallow cutting edge angle this may be a less efficient cut and prone to chattering.

An advantage of cut method 2 over cut method 1 is that is does not require the advance of cut to be known in advance. One should appreciate that method 2 cuts a typically triangular groove that grows until it severs the pipe, unlike method 1 that requires the maximum advance of cut (MDC) to be know at the start of the cut.

Other variations of these methods may be devised, for example running up and down alternate sides of the groove being formed in a way that forms a groove by only taking a small cut.

Optionally the angle (θ) at the peak of the triangle being cut in any of the preceding methods could be modified part way through the cut changing the shape of the groove. If the angle (θ) was modified continually throughout the cut then a more complexed shape of groove would be formed with curved sides.

It should be appreciated that the preceding methods could be optionally adapted to use a continual increase in cutting advance rather than a discrete increment at the start of each cut. Thus, while the cutting process still operates by moving the cutting tip back and forth in the cutting axis, rather than discretely incrementing the cutting advance at the start of each cut, the cutting advance would be advanced continually and progressively over the whole cut, which would add up to the same advance of cut over a cut. It should be appreciated that given the changing length of cut required by the methods, a continual advancement would have to operate at a changing rate consistent with the changing length of the cutting movement.

It should be appreciated that cutting method 2, including any of the adaptations, could be optionally implemented with orthogonal z-axis and radial movements by synchronously moving in the pair of orthogonal axes to replicate the compound axis cutting process of method 2. It should be further appreciated that with synchronous movement in any pair of axes any of the disclosed cutting methods, and adaptations thereof, can be optionally implemented with any pair of axes.

Figure 7:
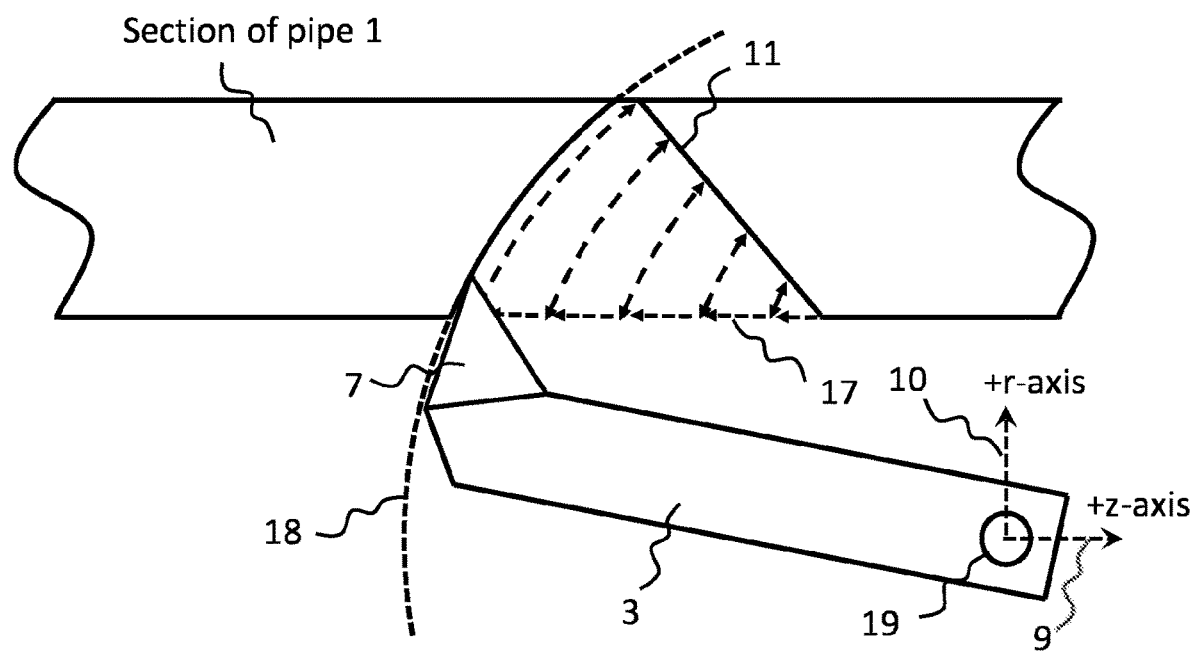
FIG. 7 illustrates the use of a hinged cutting arm showing cut method 2 cut trajectory with this arm.

The cut methods could be adapted to operate with a cutting arm (3) that is extended from the cutting head radially on a pivot (19), thus moving the cutting tip in an arc (18) as depicted in FIG. 7. The result of this is that the cutting tip now moves in an arc of movement defined by its pivot point (19) rather than on a slide. It should be understood that while the radial movement is now an arc rather than a straight line axis the essence of the cut method 1 and cut method 2 with their various options is still applicable with this arced radial trajectory.

It should be possible to see the movement depicted in FIG. 7 as a variant of cut method 2 where the compound slide movement (15) is replaced with the arc (18) of the pivoted cutting arm. FIG. 7 illustrates that by moving the cutting arm back and forward a varying distance along its arc of movement (18), defined by its pivot point (19), while advancing the cutting head in the −z-axis a groove is formed. One side of the groove is a curve defined by the arc of movement of the cutting tip on the pivoted cutting arm, while the other side is shown as a straight line which one should recognise is a function of how far the arm is progressed along its arc on each cutting sweep. As with the cut methods disclosed before for a linear slide a mathematical function can be derived to determine how far the cutting arm should be moved on each cutting sweep. It should also be appreciated that with this approach, because the cutting sweeps are a set of arcs displaced only in the z-axis, the distance between the multiple arcs is greatest at the z-axis crossing and tend to 0 as the arm position tends to perpendicular to the z-axis. In other words, this approach has a physical reducing feed of cut as the arm is extended radially around the arc (18), which can be advantageous in circumstances where pipe creep is an issue.

It should also be possible to see that the pivoting arm can be used in cut method 1 where the cut advance is defined by the movement of the cutting arm and tip about its pivot. Preferably, different maths functions are required to determine the lengths of the clearance movement, cut advance and cut length of the z-axis movement. Again, as in the previous methods, these movements can be calculated to provide various cutting tip clearances.

Cutting Tip

An optional feature of the form of the cut that is valuable for minimising power consumption of the method is sufficient cutting clearance (12) between the side walls of the cutting tip (7) and the edges of the groove being formed in the pipe (1). This clearance is advantageous for a battery powered tool to minimise rubbing at the edges of the cutting area that would waste energy and increases the risk of chattering (vibration in the tool as it cuts that leads to uneven cutting), which is also inefficient.

Figure 8:
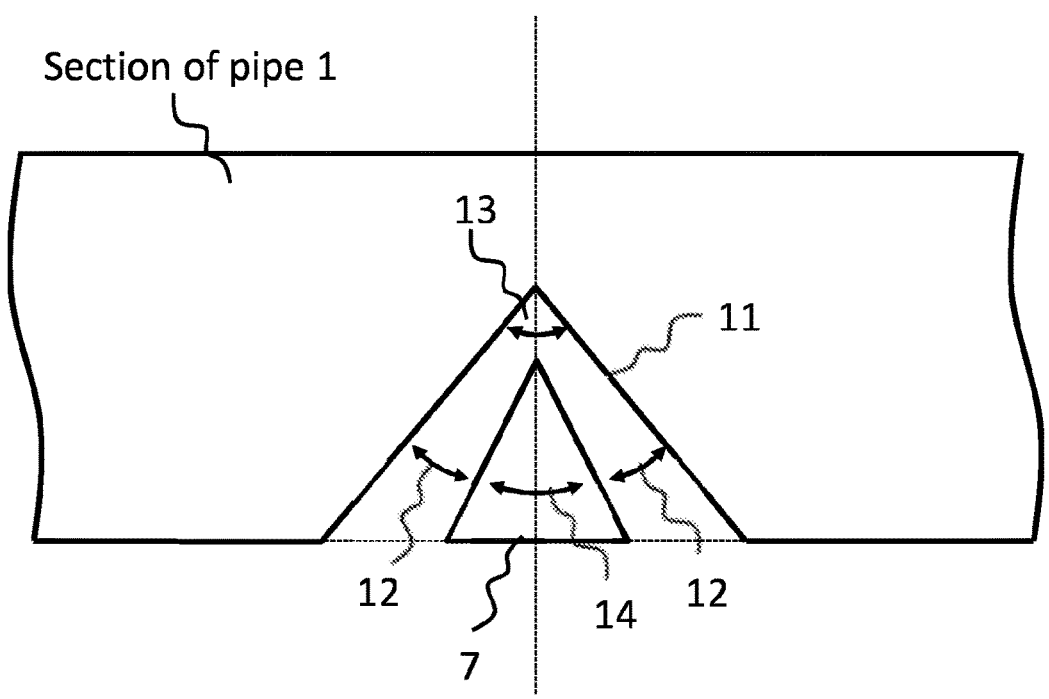
FIG. 8 illustrates basic groove to cutting tip clearance angles.

FIG. 8 illustrates the cutting clearance expressed as an angle (12) in the groove (11) and shows clearance on both sides of the cutting tip (7). A larger clearance angle (12) tends to a more efficient cutting action, however, a larger clearance angle (12) requires more total material be removed to form the groove and hence the cutting process takes longer. In practice, the process will function with any positive clearance angle (12) but a clearance of 5 to 10 degrees is considered optimal for an efficient cut without unduly increasing the duration of the cut.

It should be appreciated that the smaller the angle (14) of the cutting tip (7) the smaller the angle (13) at the peak of the typically triangular cut that provides clearance (12) and hence the smaller the area of the cut triangle. Therefore, an effective embodiment of the methods will minimise the angle (14) of the cutting tip (7) consistent with maintaining sufficient strength in the tip (7) and cutting arm (3).

The cutting tip can be formed from any material hard enough to maintain a sharp cutting edge throughout the cutting process. A preferred implementation would use a commercially available replaceable tungsten carbide cutting tip which allows the tool operator to easily replace the tip to ensure the cutting edge is maintained in good condition without having to have knowledge of how to dress or sharpen cutting tips.

It should be understood that while this whole specification is predicated on the use of a pointed cutting tip this is not intended to convey a literal razor sharp point, nor is such a sharp point practical or necessary. In practice, a small radius at the point of the cutting tip is desirable, the radius at the point of the cutting tip could typically be in the range 0.1 mm to 1 mm and the advance of cut should typically be the tip radius or more.

Accepting that it is desirable to make use of commercially available carbide cutting inserts it is apparent that this will influence the choice of tip angle (14).

Depending on the material being cut the swarf produced might tend to form long wire like strands that could tangle around the cutting head and slow, or ultimately jam, the cutting process. To help mitigate this risk it is beneficial that the cutter employ chip breaking techniques to break the swarf up and minimise the risks of entanglement.

Modern commercial cutting inserts usually have chip breaking forms moulded into the cutting tip to encourage the swarf to breakup. However, there is a limit to the size of chip breaker that can be formed in an insert and this may not be enough. Given the threat to the success of the cutting tool, the cutting arm may optionally be fitted with an additional clamp on chip breaker that augments the cutting tip breaker by forcing the swarf to bend in a much tighter radius as it leaves the cutting tip and thus breakup the swarf.

A helpful technique that can be added to the cutting method to assist in chip breaking is for the tool to intermittently lift the cutting tip from the surface being cut, typically for a revolution of the cutter. This action interrupts the flow of material over the cutting tip both allowing the swarf to cool and inserting a weakness in the swarf string thus greatly increasing the tendency for the swarf to break up.

Pipe Creep

The cutting methods disclosed thus far cut grooves that are symmetrical about the radial plane; this is advantageous to maximise the depth of the groove that is cut while minimising the amount of material that must be removed. These methods are most effective when cutting pipe in tension. However, when cutting a pipe that is in compression, as the wall of the pipe at the groove thins the groove is prone to closing up and deforming (pipe creep) which risks trapping the cutting tip. The typically triangular nature of the cutting tip used by the method helps reduce the tendency of the tip to get trapped, but as the groove closes the cutting clearance (12) is eroded and the cutting tip will tend to cut more and more on its edges which leads to an increase in load which may require more torque and power that might not be available.

An optional enhancement that could be made to assist with pipe creep is for the cut methods to include a feature to reduce the cutting feed $\delta W$ towards the edge of the cut, particularly at the edge of the groove furthest from the tool. This could be a preconfigured reduction of cutting feed or it might be a dynamic reduction based on a measure of the cutting load derived from motor current.

Figure 9:
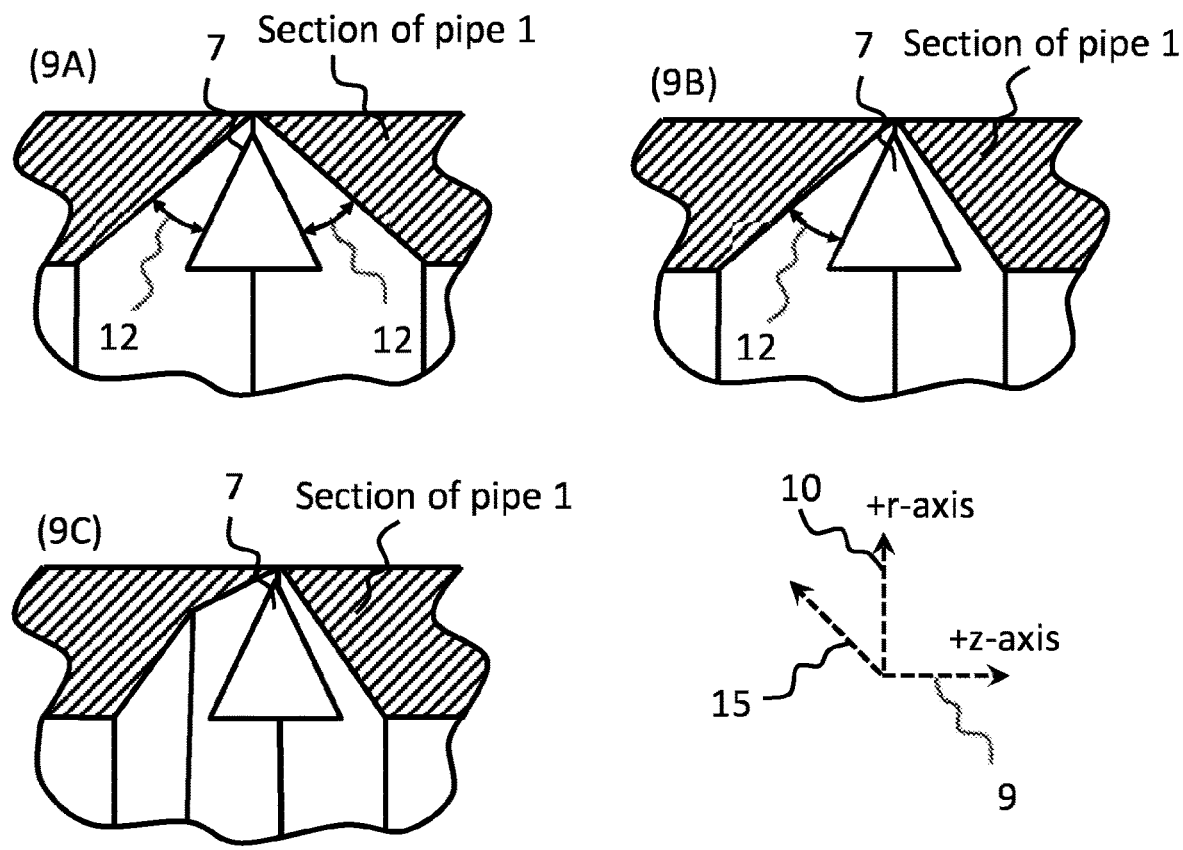
FIG. 9 illustrates alternative clearance angles for improved protection against pipe creep.

The diagrams in FIG. 9 illustrate simple modification options that may be made to the cut methods to modify groove shape to improve tolerance to pipe creep. The diagrams show cut out sections of the pipe drawn with respect to the original orientation of the tool illustrated in FIG. 2 where the tool is to the right and the cutting tip (7) is simply shown as a triangle.

Cut methods 1 & 2 could be easily modified to increased cutting clearance (12) to reduce the tendency of pipe creep to trap the cutter, this is illustrated in FIG. 9A, the consequence of this is that more material must be removed which will extend the cutting time. It should be appreciated that because the cutting tool is fixed in one portion of the pipe (right side of FIG. 9, not shown) that if the groove closes it will tend to close from the other side (left) of the groove relative to the tool, thus it is advantageous to modify the cutting method to provide an asymmetric shaped groove with more clearance on the side of the groove furthest from the tool as illustrated in FIG. 9B. If using an asymmetric clearance one might consider adjusting the angle of the cutting tip to minimise the area of the typically triangular groove being cut and so minimise cutting time.

Depending on the amount of compression in the pipe wall (1), pipe creep should not occur until the pipe wall has been significantly reduced in thickness. Thus, it is not necessary to provide increased cutter clearance until near the end of the cut and the methods could be optionally modified to increase clearance towards the end of the cut as illustrated in FIG. 9C. This allows generous clearance towards the end of the cut without excessive increase in total material that needs to be removed The optional modified cut shapes (illustrated in FIG. 9) to assist in situations where pipe creep is expected can be applied to any of the cutting methods. However, cut method 2 has a particularly effective optional arrangement to assist with pipe creep that is illustrated as different variants in FIG. 10 (using a compound axis as the radial trajectory) and FIG. 7 (using an arc as the radial trajectory) where dashed arrows typify the cutting tip (7) trajectory (17). By arranging the radial trajectory (15 or 18) to be inclined to cut towards the tool (5) the suitably adjusted cut method 2 results in the cutting taking place on the side of the groove furthest from the tool. Thus, when pipe creep occurs the cutting tip (7) will see an increase in the actual advance of cut as it traverses back and forth on the cutting trajectory (15 or 18); this can be compensated for by reducing the advance or feed of cut being applied by the cutting method. Indeed, the method could be adapted to sense the load to dynamically select the advance or feed of cut. An advantage of this approach is that the method is not required to cut more material than necessary in anticipation of pipe creep, only the creep that occurs will require additional material to be cut.

Figure 10:
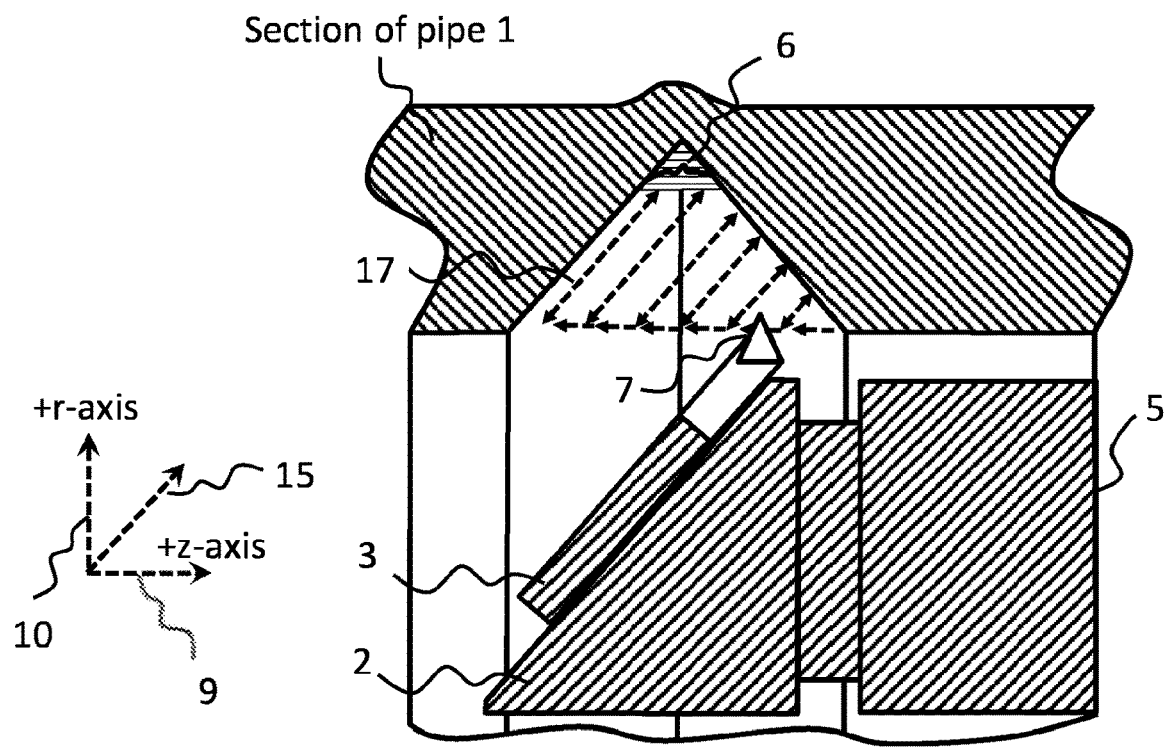
FIG. 10 illustrates the use of cut method 2 to protect against pipe creep.

A consequence of pipe creep is that not only does the whole groove tend to close, as the sections of pipe above and below the cut tend to move together, but also the material at the neck of the groove may work harden as it is deformed and may tend to flow into the tip of the groove. These effects are illustrated in FIG. 10 by the bulge in the outside pipe wall adjacent the groove and the line in area (6) which shows where material has flowed into the tip of the groove. Optionally, a cutting sub cycle (6) may be added to the cutting method to address this phenomenon; towards the narrowest point of the groove in the established cutting method the cutting stroke stops short and a small cutting sub cycle (6) is inserted where the cutter is moved back and forth to clean out the tip of the groove. Effectively this cutting sub cycle (6) assumes the bottom of the groove has been filled in and a mini cutting cycle is run to clean it out. It should be apparent that this sub cycle (6) is any of the disclosed cut methods scaled down to just clean out the tip of the groove. The cut advance and feed used in this sub cycle may be modified to assist with the harder material that might be expected in this area.

The cutting sub cycle (6) to clean out the tip of the groove may be inserted every cycle of the main cut method, though this will slow the cutting significantly. Advantageously the cutting sub cycle (6) would only be inserted when the cut method has progressed to a predefined advance in the pipe wall. Better still, the cutting sub cycle (6) could be arranged to only run when the load on the cutting tip rises significantly towards the end of a cutting stroke.

Power Control

A feature of a tool implementing the disclosed cutting methods is an efficient low power cut facilitated by taking small shavings from the pipe. A cutting feed (+δW) less than 0.3 mm is considered relatively small, but more advantageously these dimensions could be less than 0.1 mm and in some circumstances they could be reduced to 0.05 mm or less. The cutting advance may also be small but typically is maintained between 2 to 10 times the cutting feed and typically greater that the tip radius. However, down at this smallest size (+δW<0.05 mm) the duration of cut may become disadvantageously long in some applications.

The methods disclosed will work adequately with preconfigured feed and advance of cut. With a conventional DC motor (or equivalent brushless DC motor) driving the rotation of the cutting head the power drawn by the tool from either a wireline or a battery type source will naturally regulate to some extent due to the source impedance of the batteries/wireline causing the supply voltage to drop and hence the speed of rotation to fall while more supply current becomes available. However, ultimately the maximum available torque is limited by supply current not power.

It is quite practical for the method to measure the load (main motor current) and adjust cut feed δW and cut advance δD during the cutting process to assist in staying below a configured or sensed electric current or even power limit. It should be appreciated that it is not very practical to modify cutting advance δD partway through a cut. The cutting advance δD is generally better as a fixed value through the cut, or if modified, it should be changed at the start of each cutting stroke, and to avoid overload, the method should start with a small cutting advance.

There are potentially three optional cutting power or current control loops. Firstly, during cutting movement the cutting advance velocity could be controlled to maintain the demanded cut feed δW; this is a first servo loop taking demanded cut feed δW and the main motor speed, which defines speed of rotation of the cutting head. Optionally, a secondary outer servo loop can then be implemented around this first loop that adjusts demanded cut feed δW to achieve a target load current or power demand. If these optional control loops are implemented it is practicable to optionally adjust the cutting advance at the start of each cutting stroke based on the mean cutting feed over the last cutting stroke compared to the optimal cutting feed, this may be based on the simple relationship that torque is approximately proportional to the area of cut (δW×δD).

It should be appreciated that the first control loop to address cut feed is not required if a constant velocity main motor drive is implemented, in which case cut feed can be more directly controlled by cutting advance velocity set by the secondary outer servo loop.

While not absolutely essential in all embodiments and applications it is generally desirable in most that the method and any tool implementing the method ensure that the cutting process will reach an end of cut event that signals the end of cutting and ensures the cutting arm will be returned to the stowed position within the circumference of the tool and the anchors be released.

Optionally, the drop in the cutting load when the cutting tip breaks through the outside wall of the pipe is detected and used to trigger the end of cut event. Cutting load is proportional to motor current, thus may be detected through measurement of motor current.

Embodiments should have an option to configure a maximum advance of cut (MDC) that will trigger the end of cut event in the absence of any other trigger. Optionally a cutting time limit may be provided that will trigger the cutting completion event. Optionally, this time limit would be implemented diversely to the electronics controlling the cutting operation in order to provide redundancy to the triggering of the cutting completion event.

One concern for examples of the present disclosure will be the risk that a failure of the tool partway through a cut could leave the tool stuck in the pipe hung up on the extended cutting arm (3). This risk can be mitigated by designing the cutting arm with a weak point in the z-axis such that the arm is ridged enough to cut but the arm will fail at the weak point with significant force in the longitudinal axis of the tool applied from the tether. It should be appreciated that the cutting method disclosed here has been devised to minimise cutting force in order to minimise power consumption and that makes it very practical in all embodiments for the force applied by the tether to be capable of breaking a weak point in the cutting arm without said weak point compromising the cutting process.

It should be appreciated that while an aim of the cutting method is to provide a low power means of cutting through pipe the tool that implements the method can be readily adapted to machine grooves inside a pipe, or indeed open up the internal diameter of the inside of a pipe at a particular location.

A tool designed to implement the method could be used to clean up the inside diameter of a section of corroded pipe or return the inside of a pipe to a round section in preparation for some other process that requires an area of the inside of the pipe to be dressed.

A tool implementing the cutting method disclosed here can be deployed into a pipe and commanded by any established means to execute its cutting operation. Perhaps the simplest means of control is to use time. The operator configures the tool with a specific operate time, runs the tool into the pipe and gets it into position before the operate time occurs, then waits for the operate time to be reached, and when sufficient time has been allowed to complete the cut, withdraws the tool.

Outline Implementation

Figure 11:
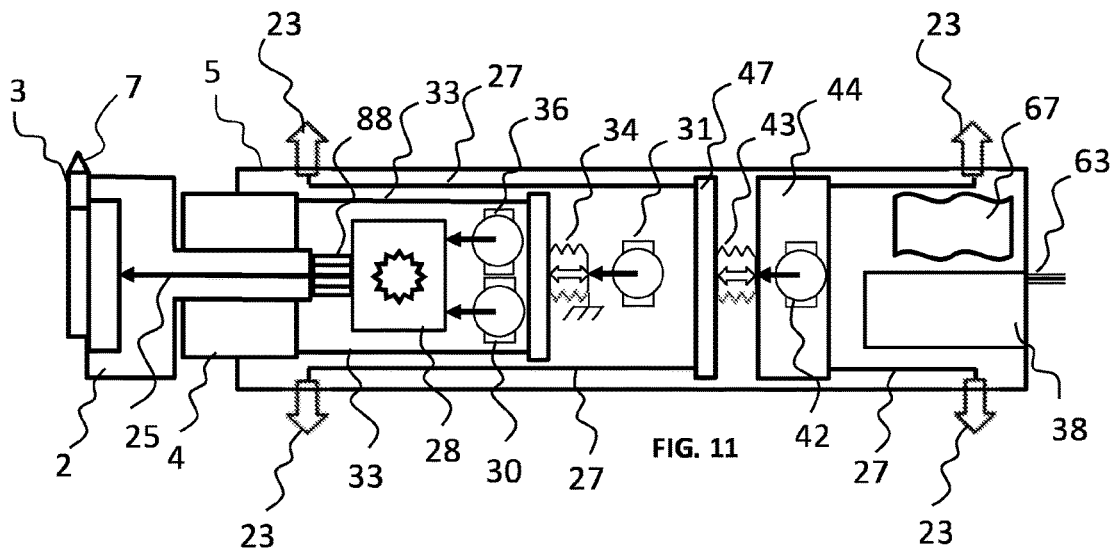
FIG. 11 is a schematic outlining the main elements of a practical embodiment of a tool implementing the cutting method where all the drives and controls are fixed within the main tool body, referred to as "fixed drives"

The schematic diagram in FIG. 11 outlines an embodiment of a tubular tool capable of implementing the disclosed cutting method. The tool body (5) must be firmly anchored inside the pipe being cut; this is achieved in this embodiment with two sets of deployable anchors (23) at each end of the tool. It is advantageous that one set of anchors(23) are located in proximity to the cutting head (2) to centralize the head within the pipe, while the other set are axially distal to provide axial stability of the tool. Other embodiments might use slips (exterior bars) that run the length of the tool, and thus would provide a large contact area, but this may compromises the space within the tool. Generally, any anchoring method that firmly holds the tool in the centre of the pipe while cutting can be used.

The anchors (23) could be driven hydraulically; this is an effective means of delivering significant effort to the two ends of the tool from a drive motor and hydraulic pump. However, there is limited space in proximity to the cutting head to mount a hydraulic actuator of sufficient size to drive the anchors. The diagram of FIG. 11 shows an equally effective implementation using linear drive rods (27) run from the two sets of anchors(23) to a distal linear actuator (43, 44, 47) that comprises a motorised leadscrew to generate linear movement. To set the anchors the leadscrew (43) is rotated to pull the actuator chassis (44) towards the opposing drive plate (47) inducing tension in the drive rods (27) that consequently force the anchor arms (23) outward anchoring the tool in the pipe. One should appreciate that no part of the linear actuator is fastened to the tool housing in the axial direction, the mechanism acts to put the same tension in the drive rods (27) to the two distal sets of anchors. This means that the anchors are effective regardless of the diameter of pipe at the two anchor points. It also means that releasing one set of anchor drive rods (27) will release both sets.

With the main tool body (5) firmly anchored in the centre of the pipe to be cut the cutting process can begin. The cutting method requires the cutting tip (7) to be moved in three axes, rotated concentric with the tool body, advanced radially to contact the pipe and moved in the longitudinal axis of the tool. This is achieved with a cutting head (2) that rotates on bearings in a quill (4) than can be moved in the z-axis, while mounted on the cutting head is a slide that allows the cutting arm (3) holding cutting tip (7) to be advanced radially.

While the diagram shows the arm (3) advanced perpendicular to the z-axis in a linear slide, it has been disclosed that there are advantages to inclining the cutting arm slide, and it has also been disclosed that the arm could swung in an arc radially from the cutting head hinged on a pivot rather than run in a linear slide.

Independent control of the cutting arm (3) position might be achieved by either mounting an electro-mechanical drive (typically motor or solenoid) in the cutting head or alternatively through a mechanical means (typically gearbox) of transferring the control effort onto the rotating cutting head. The preferred embodiment is to mount the motor and reduction gearbox (30), which controls the cutting arm position, in the main body of the tool and use a mixing gear box (28) to combine cutting head rotation and control of the cutting arm position. More detail of this mixing gearbox (28) is given in later text. The mixing gearbox (28) rotates the main cutting head (2) with the drive from the main motor and reduction gear box (36) concentric with the rotary shaft (25) that drives the position of the cutting arm (3) and is controlled from radial motor and gearbox (30).

It should be apparent that for the quill (4), carrying cutting head (2), to move in the z-axis relative to the tool body (5) some form of sliding coupling (88), typically a splined shaft, is required between the rotating cutting head (2) and the mixing gearbox (28) as well as between the rotating radial control shaft (25) and the same mixing gearbox (28).

Given that the tool is of limited diameter it may be helpful to separate the various controls spatially in the longitudinal axis of the tool. Considering that the space proximate to the quill (4) is at a premium, it is desirable to locate the quill drive mechanism distal to the quill (4). This can be achieved with the use of longitudinal drive rods (33) coupling the quill (4) to a plate that can be moved in the z-axis by leadscrew

(34) driven from control motor and gearbox (31). Provided these drive rods (33) are confined axially they can be relatively long without any significant bending that would detract from the rigidity of the Quill (4) positional control.

For operation in an oil well, or any pipe with fluid in it, the internal mechanism of the tool benefits from being sealed. It should be apparent that for the quill (4) to move the volume of the tool is changing, which if the tool is to be sealed, presents a challenge in any pressurised environment. The preferred embodiment for operation in pressurised environments is to fill the tool with oil and fit a compensator (67) that will balance the pressure of the fluid in the tool with that of the pressure external to the tool.

The batteries that power a battery powered embodiment should be housed in an atmospheric chamber; this requires an electrical pressure barrier (63) between the oil filled tool and the atmospheric battery pack (not shown). A suitable battery chamber will enable the tool to operate from Lithium or Alkaline cells.

Implementation Variations

Figure 12:
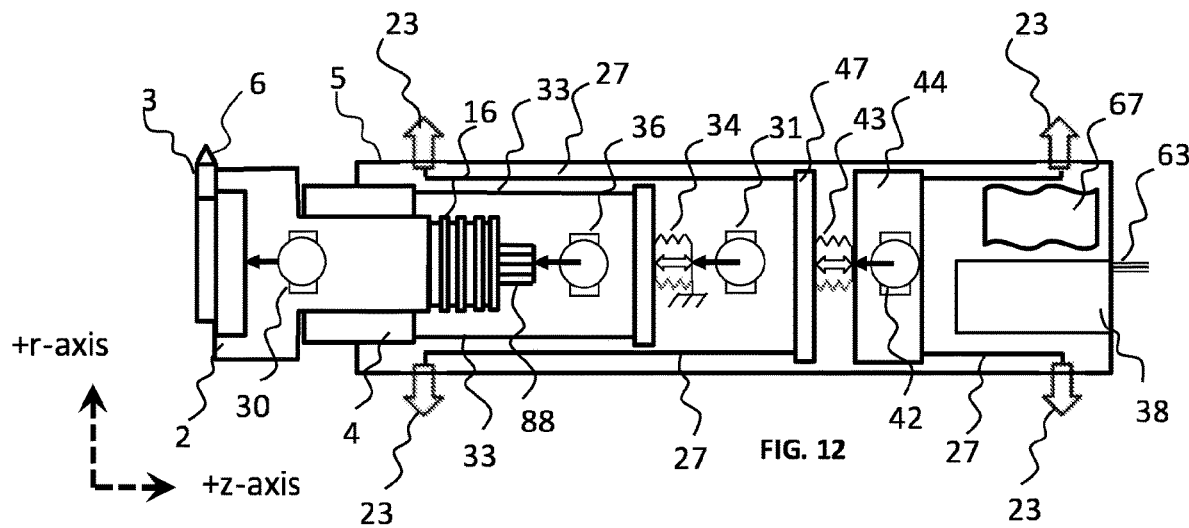
FIG. 12 is a schematic outlining a variation of the arrangement of the main elements where the radial slide motor is mounted in the cutting head, referred to as "motorised head"

FIG. 12 outlines an alternative "motorised head" arrangement of a tool capable of implementing the cutting method disclosed here. In this implementation the mixing gearbox (28) is discarded by mounting the radial drive motor and gearbox (30) in the rotating cutting head (2).

Mounting the radial drive motor and gearbox (30) in the cutting head (2) simplifies the mechanical drive of the head but it complicates the electronic control of the radial drive motor (30). A set of electrical slip rings (16) is required to allow the electrical control of the motor, but this may present reliability concerns, and unless suitable control electronics is also located proximate to the motor (30) in the cutting head (2) a number of slip rings would be required to provide both power drive of the motor and sensing of position.

The "motorised head" approach outlined in FIG. 12 may be slightly more efficient as it avoids the need for a mixing gear box (28) and may also lend itself to smaller diameter implementations of the tool where it becomes increasingly important to lay the tool out in a thin tubular structure.

Figure 13:
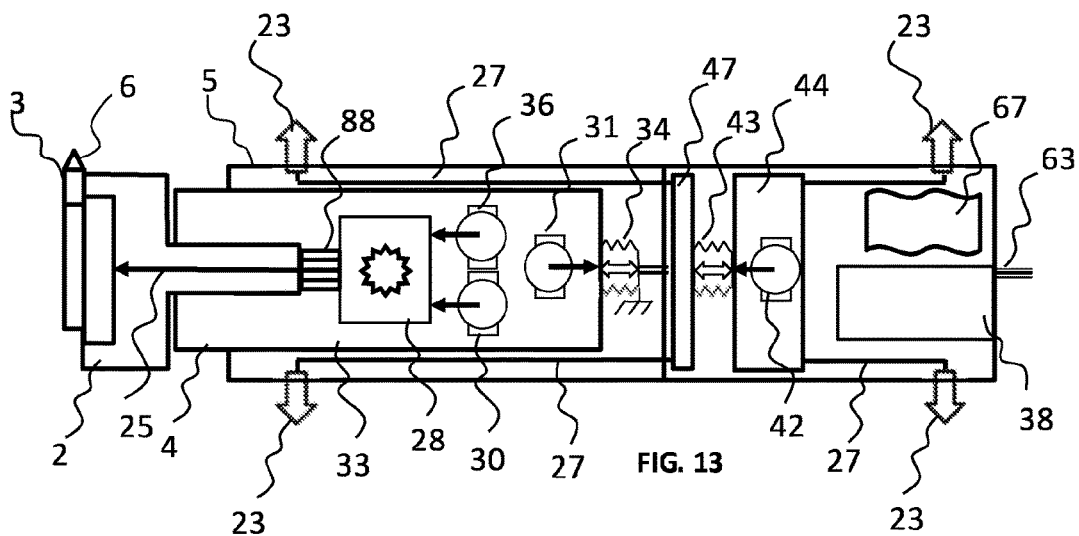
FIG. 13 is a schematic illustrating a third variant where the main cutting drives and controls are mounted in a moving quill, referred to as "moving drives"

Another alternative arrangement of the tool worth noting is referred to as "moving drives" and is outlined in FIG. 13. In this arrangement, the bulk of the mechanism, as disclosed in FIG. 11, is mounted inside a tube (the quill 4) that slides within the main housing (5) and the position of the quill (4) in the main housing (5) is controlled by driving (34) against the main housing at the distal end of the tube to the cutting head (2). This "moving drives" arrangement helps reduce the complexity and density of the mechanism proximate to the cutting head (2), which may be advantageous in smaller diameter embodiments It should be apparent, without need for a diagram and significant explanation that the slip ring approach of the motorised head in FIG. 12 could be used in the "moving drives" approach of FIG. 13.

Implementation Example

The next section of this specification describes an early implementation of a 2⅞" diameter example of the disclosure using the "fixed drives" approach captured schematically in FIG. 11.

One of the challenges of a tool that implements the disclosed cutting method is arranging all the various controls and drives within a cylindrical tool that can be run into the pipe to be cut. The general approach is to arrange the various essential drives axially along the tool as cylindrical modules that screw together.

Figure 14:
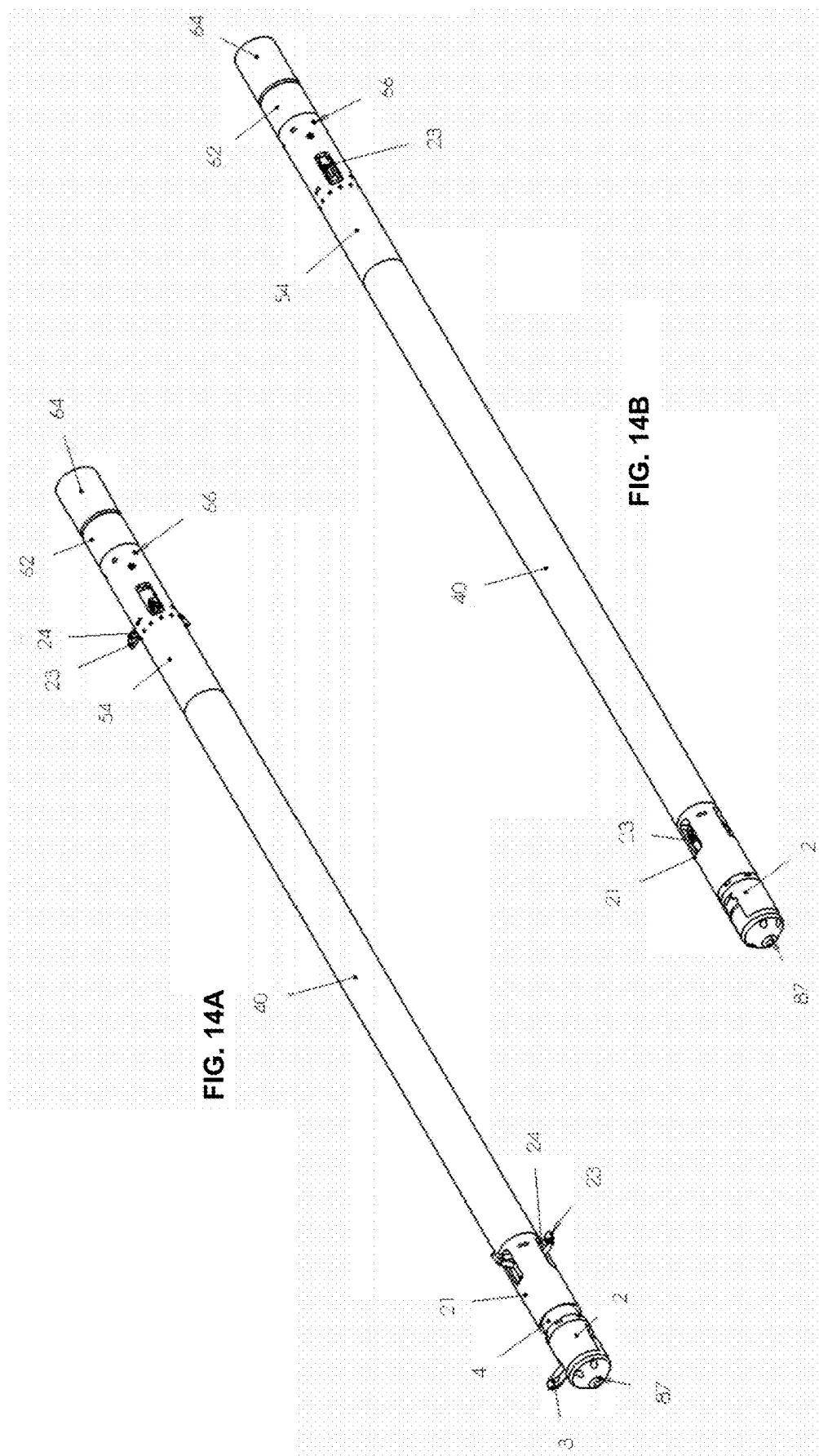
FIG. 14 is an external isometric drawing of an example fixed drives tool showing the tool with; A) all axis and anchors extended and B) all axis and anchors retracted.

FIG. 14 shows an example of the disclosure housed in the main structural tubulars (21, 40 & 54). FIG. 14A shows the tool with its anchors and cutting features fully extended, while FIG. 14B shows the same tool with the anchors and cutting features fully retracted.

Referring to FIG. 14A, the cutting head (2) is at the bottom of the tool and is shown extended axially by the quill (4) that it rotates in. The quill (4) slides axially in the lower cylindrical housing (21) that also houses the lower anchor mechanism. The lower anchor mechanism comprises three sets of anchor arms (23, 24) arranged at 120 degree intervals around the circumference of the tool. The main tubular body (40) rigidly joins this lower housing (21) to the upper compensator and anchor housing (54) that houses a similar arrangement of three sets of anchor arms (23, 24).

Retained in the top of the upper anchor housing (54) by cap (62) is a releasing mechanism. Shear pins (66) disposed around the circumference of the housing (54) hold the upper tool connection (64) in position inside the housing. This releasing mechanism provides that heavy jarring on the tool, which is only practically achievable if the tool is anchored, will shear the pins (66) freeing the upper tool connection (64) to move a small distance away from the tool and in so doing the top anchors are released from the anchor drive. With the top anchors released from the anchor drive the tension on the lower anchors is also released.

Figure 15:
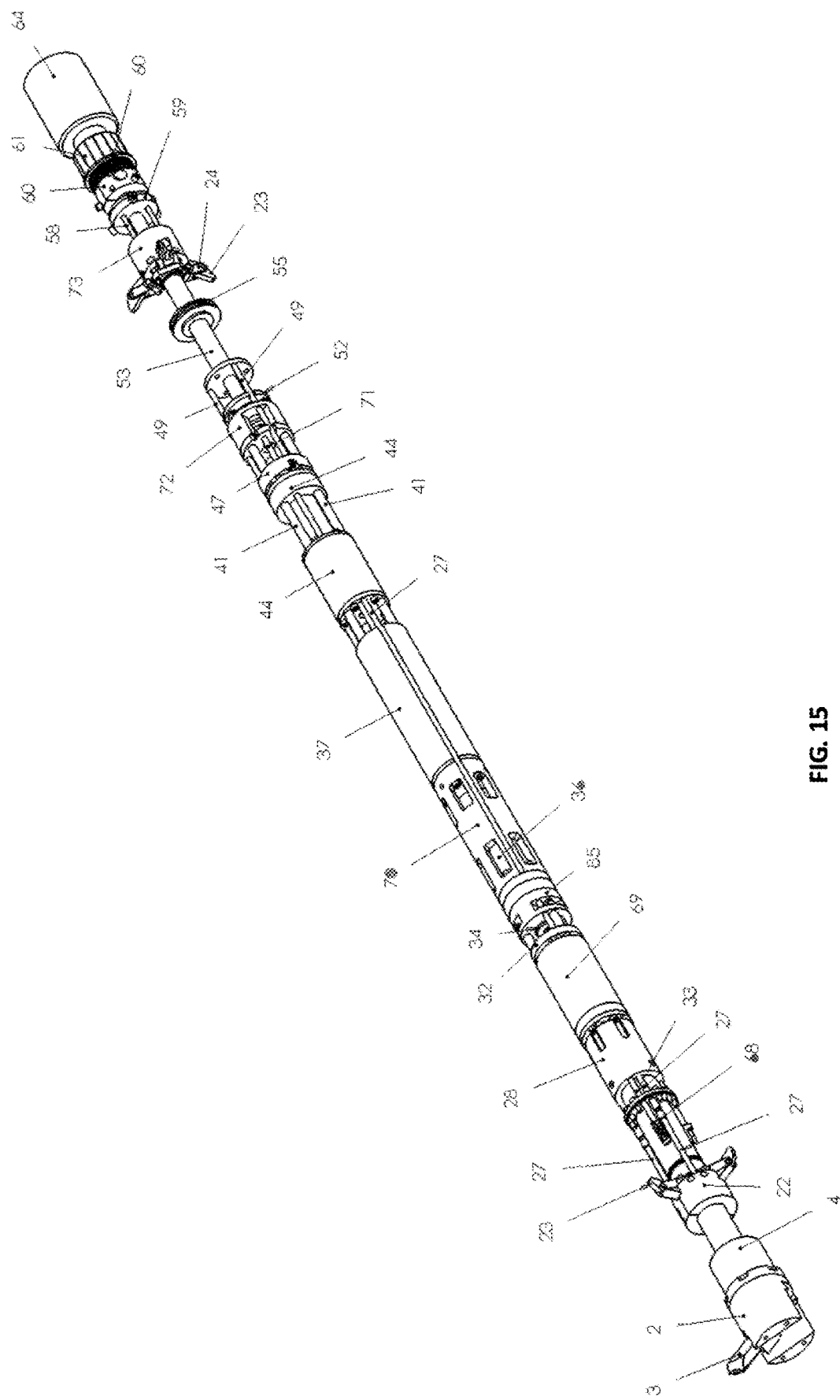
FIG. 15 is an isometric drawing of the fixed drives tool of FIG. 14 with anchors and axis extended and outer housing hidden to reveal the internal skeleton of the tool.

FIG. 15 illustrates the same example tool with anchors and cutting features extended and the outer housings removed. The assembly of the tool starts with the assembly of the internal modules from gearbox (28) to the internal parts of the compensator (53, 55), this internal assembly is then flange bolted to the preassembled lower housing (21). The anchor and quill drive rods (27 & 33) are then made up before the main housing (40) is fitted over the internal modules and screwed to the lower housing (21). Then the compensator and upper anchor housing (54) is screwed to the main housing (40) and the tool oil filled. Finally, the upper anchors, release mechanism and upper tool connection (64) is assembled completing the tool.

It should be appreciated that the compensator piston (55) benefits from being accurately located concentric within its housing (54) to provide reliable compensation and sealing. Yet there are cylindrical parts from the main chassis that run through the compensator. To avoid minor axial misalignment of the internal modules affecting compensator performance a flexible coupling (72) is provided on the internal chassis that allows the compensator parts to be accurately centralized by centralising plates (52 & 59) within their housing (54) while remaining attached to the main chassis.

Cutting Head

Figure 17:
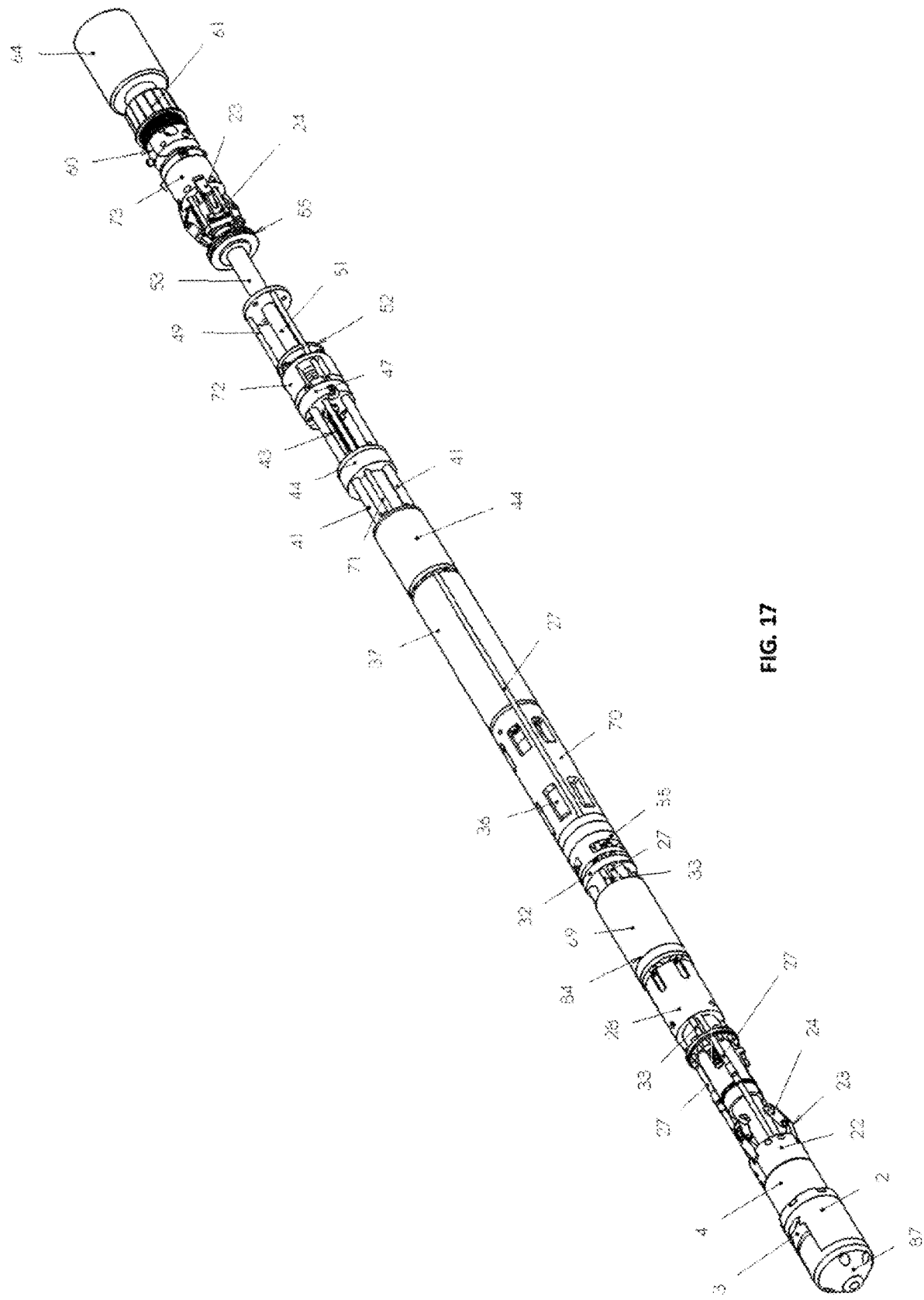
FIG. 17 shows an isometric drawing of the same tool as FIG. 15 but with the anchors and axis retracted.

The cutting head (2) is visible at the bottom of the whole tool in FIGS. 14, 15 & 17. A section view of the cutting head (2) and quill (4) is shown in FIG. 19 that shows the arrangement of these parts with the tool in the anchors closed, quill withdrawn and cutting head parked condition.

At the bottom of the tool the cutting head (2) supports the cutting arm (3) in a tight dovetail slide way that allows the arm (3) to slide radial to the tool at a compound angle favourable for clearance of the cutting tip (7). The position of the cutting arm (3) is determined by leadscrew (74) that is rotated through bevel gears (75) driven from the radial control shaft (25). Rack and pinion drive is an obvious drive alternative, but with higher back drive forces and the length of the drive shaft (25) this may compromise rigidity of arm extension. Optionally, the slide way could be replaced with a pivoting cutting arm.

There is no facility in this embodiment to tighten the cutting arm (3) slide way. Given the light use of the cutter, it is envisaged that the slide way will be cut to a tight tolerance that will serve the life of the tool with no need to adjust the slide way. If tightening the slide way was desired the fitting of jib strips or some form of screw compression device on the slide way is quite practicable.

This embodiment uses a slim 35 deg (iso V type) tungsten carbide insert. Allowing for 5 deg clearance each side of the insert the grooving being cut would have an include angle of 45 deg. To move the cutter down one side of the groove the slide is angled at 22.5 deg from perpendicular to the longitudinal axis of the tool. This particular form of insert is generally used for more specialised machining, and is not intended for heavy material removal, this is consistent with a power limited implementation of the cutting tool (like a battery powered tool) where small cuts will be taken and it is desirable to minimise material being removed.

The next smallest angled insert commonly available at the time of writing would be 55 deg (iso D type); this would require a slide angle in excess of 32.5 deg and removal of more total material to complete the pipe cut.

Just visible in the section view of FIG. 19 is a screw hole and alignment pin on the arm (3) proximate to the cutting tip (7) to permit the fitting of a secondary chip breaker to encourage disintegration of the swarf stream from the cutting tip (7).

The cutting head (2) rotates in the tool axis on main bearing (20), which is typically a taper roller bearing, and set in the quill (4). The cutting head (2) is held in place at the back of the quill (4) by rear bearing (26), typically also taper roller. With the distance between the bearings accurately controlled (shimming may be required) there should be very little play in the rotation of the cutting head, while it will run freely with minimal fiction and thus minimal power loss.

Above the rear bearing (26) the back of the cutting head has a splined shaft that extends into the mixing gearbox (28) engaging with a splined socket in a planet holder (76). The radial drive shaft (25) runs concentrically inside the cutting head and extends beyond the back of the cutting head into the mixing gearbox (28) where it engages in a spade socket in the other planet carrier (83) in the mixing gearbox. More detail is given on the gearbox later.

In practical operation a pointed nose (87) on the tool helps it negotiate deformations and restriction in the pipe as it is run into position, as well as shield the cutting arm (3) and tip (7) from impact. To help protect the quill bearing (20) from impact when running into the pipe the tool can optionally fully withdraw the quill (4) so the cutting head (2) is pulled hard against a tapered shoulder in the housing (21), thus any impact on the cutting head (2) is transferred directly to the tool housing (21).

The cutting head (2) is sealed at the lower end of the quill (4) beyond the main bearing so the tool's oil reaches the main bearing (20) providing clean lubrication. The internal radial drive shaft (25) is also sealed proximate to the bevel gear (75). This leaves the bevel gears (75), leadscrew (74) and cutting arm slide (3) running in the external well environment. A port can be provided to pump grease into the area around the gears (75) and leadscrew (74). This allows flushing of debris and fluid after a run and minimises service interval on these parts. Further, it is quite straight forward to remove the nose (87), cutting arm (3) and top section of the cutting head (2) (where the bevel gears mate) and clean this area of the cutting head without dismantling the rest of the tool.

Optionally the cutting arm slide, leadscrew and drive gears could be sealed inside the cutting head so that just the cutting tip extends into the well environment. However, this tends to reduce the maximum extension and rigidity of the cutting arm.

The mixing gearbox (28) allows the radial drive motor and gearbox to be coupled to the leadscrew (74) controlling the radial extension of the cutting arm (3) while being located in the body of the tool. While this introduces significant backlash in the drive of the cutting arm it does mean the position of the arm can be controlled without necessarily requiring position sensing in the cutting head. Therefore, a stepper motor, synchronous motor or brushless DC motor can be used to control and, through the stepping action, track the position of the cutting arm accounting for backlash in the gearbox. Position sensing may be enhanced with a separate shaft encoder on the drive into the mixing gearbox (28), protecting against the risk of drive motor stall.

It should be appreciated that accurate absolute position of the cutting arm is not critical, provided that incremental position is accurate and reliable. Sufficient absolute reference can be obtained by driving the arm against its parked position end stops to give an absolute start reference accurate enough to determine, through accurate incremental movement, when the arm has reached its maximum configured extension. The cutting method disclosed here can operate by extending the arm until cutting is detected, through load on the main motor, from this point accurate incremental position tracking is sufficient to implement the cutting method.

The section view in FIG. 19 also shows how the anchors (22, 23 & 24) are fitted around the quill (4) which is reduced in diameter in this area to provide space for the anchors.

Control Rods

Figure 16:
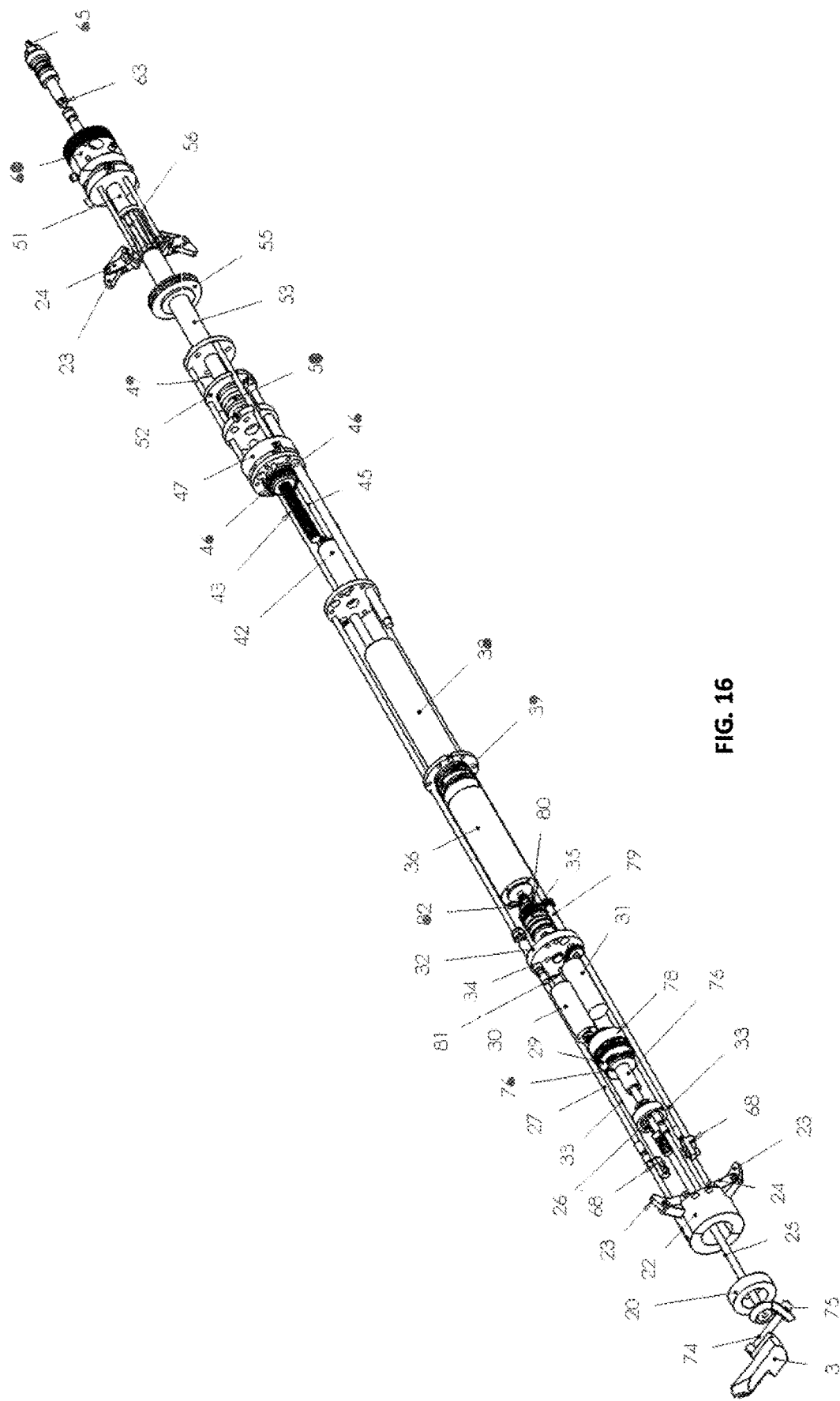
FIG. 16 shows the same tool as FIG. 15, but with the main chassis elements removed revealing much of the internal mechanisms.

Inspection of FIGS. 15, 16 & 17 will reveal the anchor and quill controls passed along the tool through the use of control rods (27, 33 & 49) arranged around the circumference of the chassis. Rods used in tension or compression (anchor drive or quill drive) are run as groups of three, spaced at 120 deg around the circumference, as this keeps the axial loads relatively balanced.

The anchors are arranged to be controlled by rods in tension which allows considerable force, up to the tensile limit of the rods, to be transferred to the anchors.

Figure 18:
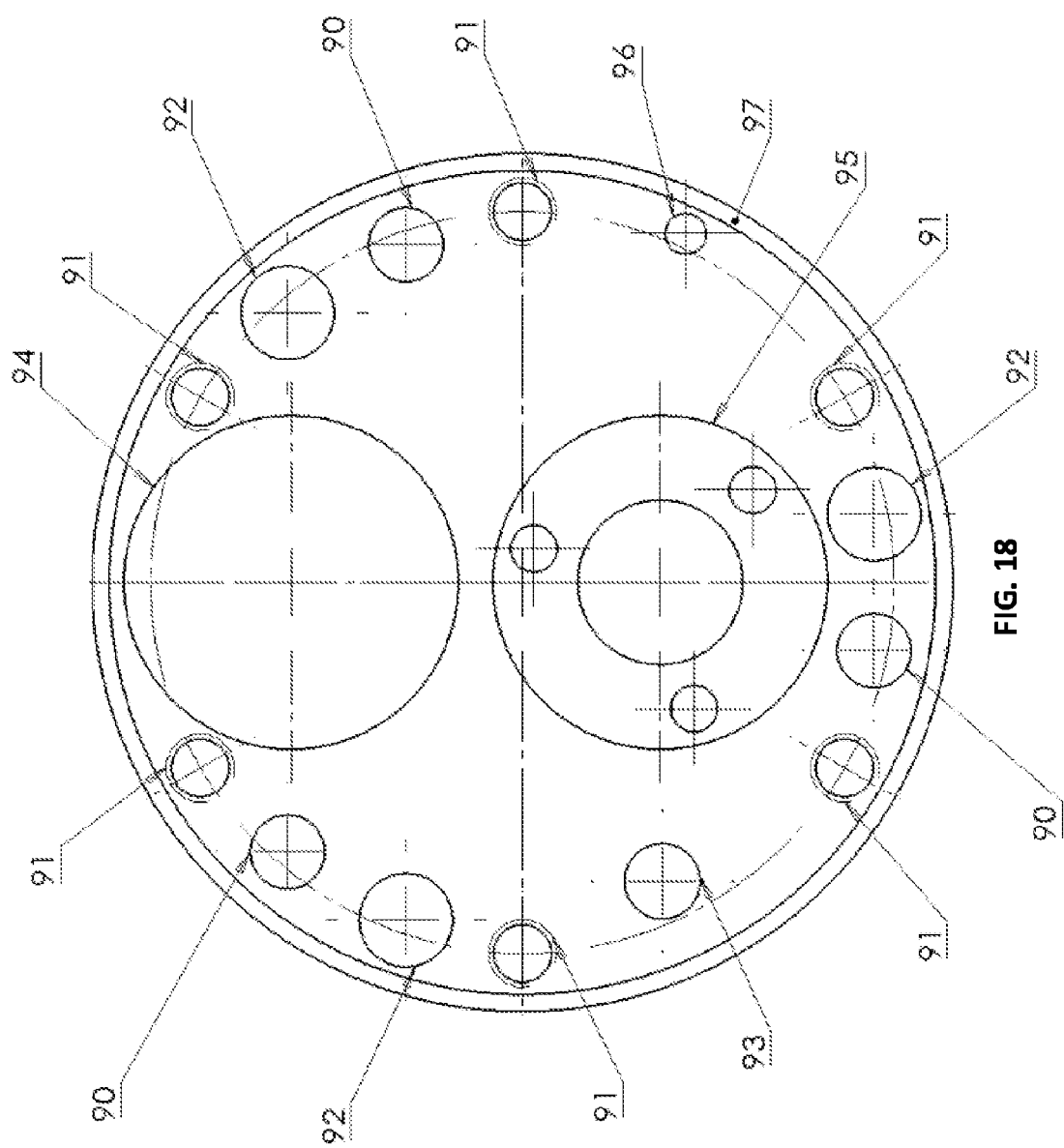
FIG. 18 shows an end view of the control motors chassis (69) that illustrates the arrangement of drive rods and bolts at this point in the tool.

FIG. 18 illustrates the end of the control motor chassis (69) which shows the circumferential dispersal of control rods and flange bolting at this point in the tool. The main area in the bulk of this chassis element houses the control motors and gearboxes for the radial drive (94) and quill drive (95). One will see there are three holes (90) in which the anchor control rods (27) run through the chassis, evenly spaced around the circumference. There is another set of three holes (92) for the quill drive rods (33) interleaved around the circumference. These holes are grouped to fit within a pattern of 6 flange bolt holes (91) used to clamp the chassis elements together. Finally, in this part of the chassis, the main motor rotary drive shaft runs in the hole (93) to transfer rotary torque from the main motor (36) above to the mixing gearbox (28) below.

One will see there is a circular flange (97) machined in the face of this chassis element that is a tight fit with a mating flange on its mating chassis element, this keeps the assembled modules concentric. Finally, a dowel hole (96) is provided to ensure the modules are correctly rotationally aligned.

Clearly the details of the shafts, rods, alignment and fastening arrangement varies between different elements but the arrangement in FIG. 18 is representative of the approach taken throughout the tool.

Mixing Gear Box (28)

With reference to FIG. 19, the first chassis element above the lower anchor housing (21) is the mixing gearbox (28) which is flange bolted at its lower end to the lower anchor housing (21) and its upper end to the control motor chassis (69). The gearbox accepts a main input drive from the main drive motor (36) through a rotary drive shaft (81, FIG. 16) and an auxiliary input drive from the radial axis motor and gearbox (30). The output from the gearbox is two concentric drives, the outer of which is a reduction drive to rotate the cutting head (2) and an inner shaft (25) that controls the cutting arm (3) radial position.

Figure 20:
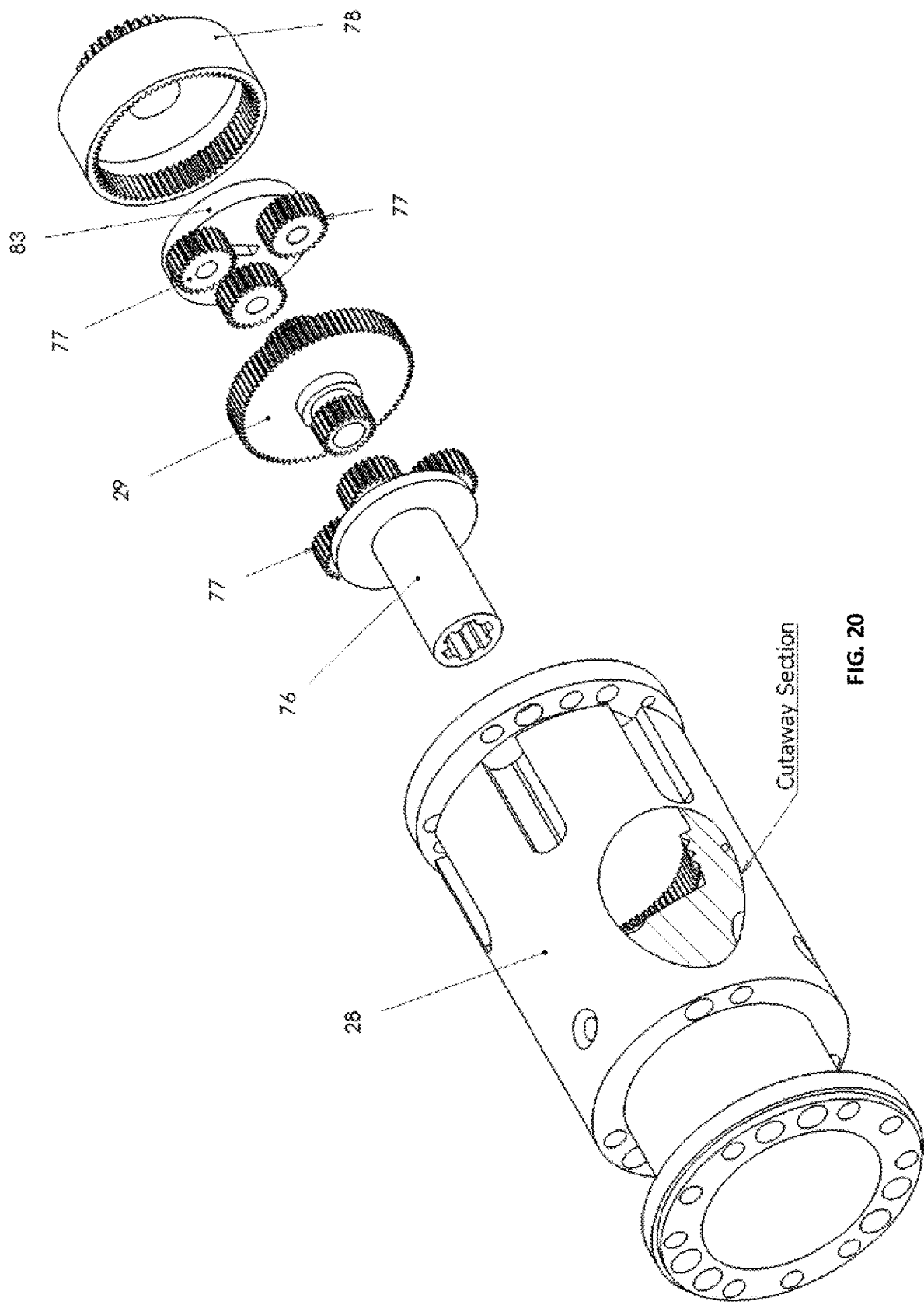
FIG. 20 shows a planetary implementation of the mixing gearbox (28)

FIG. 20 shows an exploded view of the mixing gearbox (28) that illustrates the main gear elements. To understand the operation of this gearbox it is important to realise that there is an internal ring gear in the chassis (28), just visible through a cutaway in the drawing of FIG. 20, that engages with planetary gears (77) on planet holder (76). In this example all the planetary gears (77) in the mixing gearbox (28) are the same size.

The drive from the main motor (36) enters the gearbox as a pinion gear that meshes with the large outer gear wheel of the central sun gear (29), providing a first reduction of the drive as it enters the gearbox. The pinion on the front of the sun gear (29) engages with planetary gears (77) mounted to planet carrier (76), these gears (77) also engage with a ring gear cut into the chassis (28). The other pinion at the back of the sun gear (29) engages with planetary gears (77) mounted on planet carrier (83), this set of planet gears also engage with a ring gear in the radial drive ring gear (78). The pinions on the front and back of the sun gear are the same size in this example.

It should be apparent that the rotation of the sun gear (29) will drive the front planet gears (77), which in combination with the fixed ring gear cut into the chassis (28), will cause the main drive planet holder (76) to rotate at a reduced speed. This planet holder (76) is connected to the cutting head (2) by splines that permit transmission of rotational torque as well as permitting longitudinal extension of the cutting head (2) through movement of the quill (4).

It will also be apparent in this example that provided the radial drive ring gear (78) is held stationary (relative to gearbox chassis 28) and the pinion on the back of the sun gear (29) is the same size as that on the front then the radial drive planet holder (83) will rotate in synchronism with the main drive planet holder (76). The radial drive shaft (25) that runs through the centre of the cutting head (2) passes through the centre of the sun gear (29) and engages with the slot in the radial drive planet holder (83). This couples the radial drive shaft (25) to the radial drive planet holder (83) and ensures that, provided the radial drive ring gear (78) is stationary, radial drive shaft (25) will rotate with the cutting head (2) and there will be no movement in the cutter arm (3) position.

Following on from the preceding explanation, it should be apparent that rotation of the radial drive ring gear (78) will modify the position of the radial drive planet holder (83) relative to the cutting head (2) that will consequently move the cutting arm (3). It should also be apparent that the slot in the radial drive planet holder (83) will engage with a spade on the radial drive shaft (25) which will transmit the rotation while allowing z-axis movement of the shaft (25) with the cutting head (2).

The radial drive ring gear (78) is rotated or held stationary by the radial axis motor & gearbox (30) through a pinion that engages with the external gear on the back of radial drive ring gear (78). The arrangement of these elements is better seen in FIG. 16 which shows the whole tool with the chassis elements removed.

It should be appreciated that while the preceding mixing gearbox example shows identical planet gears throughout the gearbox and identical pinions on the front and back of the sun gear (29) this is not essential, size and numbers of planet gears between front and back is optional. What is essential to the operation is that the gear ratio from sun gear (29) to main drive planet holder (76) is the same as the gear ratio from sun gear (29) to radial drive shaft (25).

Quill Drive

The quill (4) has to be of sufficient length to effectively transfer the bending moment from the cutting operation to the tool body with minimal play, yet it is desirable to locate the quill (4) in proximity to the anchor arms (23). The preferred implementation is best understood from the section view shown in FIG. 19 where the Quill (4) passes through the anchor drive sleeve (22) and the anchor arms (23,24) and is supported in the bottom housing (21). To achieve this the quill (4) has to be a relatively narrow diameter in proximity of the anchor arms (23), but benefits from a larger diameter at the back end to accommodate the bearing (26) and be a close sliding fit in the housing (21), thus the anchor drive sleeve (22) is split so that it can be clamped around the quill (4) before being inserted into the housing (21). The anchor arms are three pairs; each pair being a link arm (24) and main arm (23), held together and held in the lower housing (21) and anchor drive sleeve (22) by press fit pivot pins.

Figure 21:
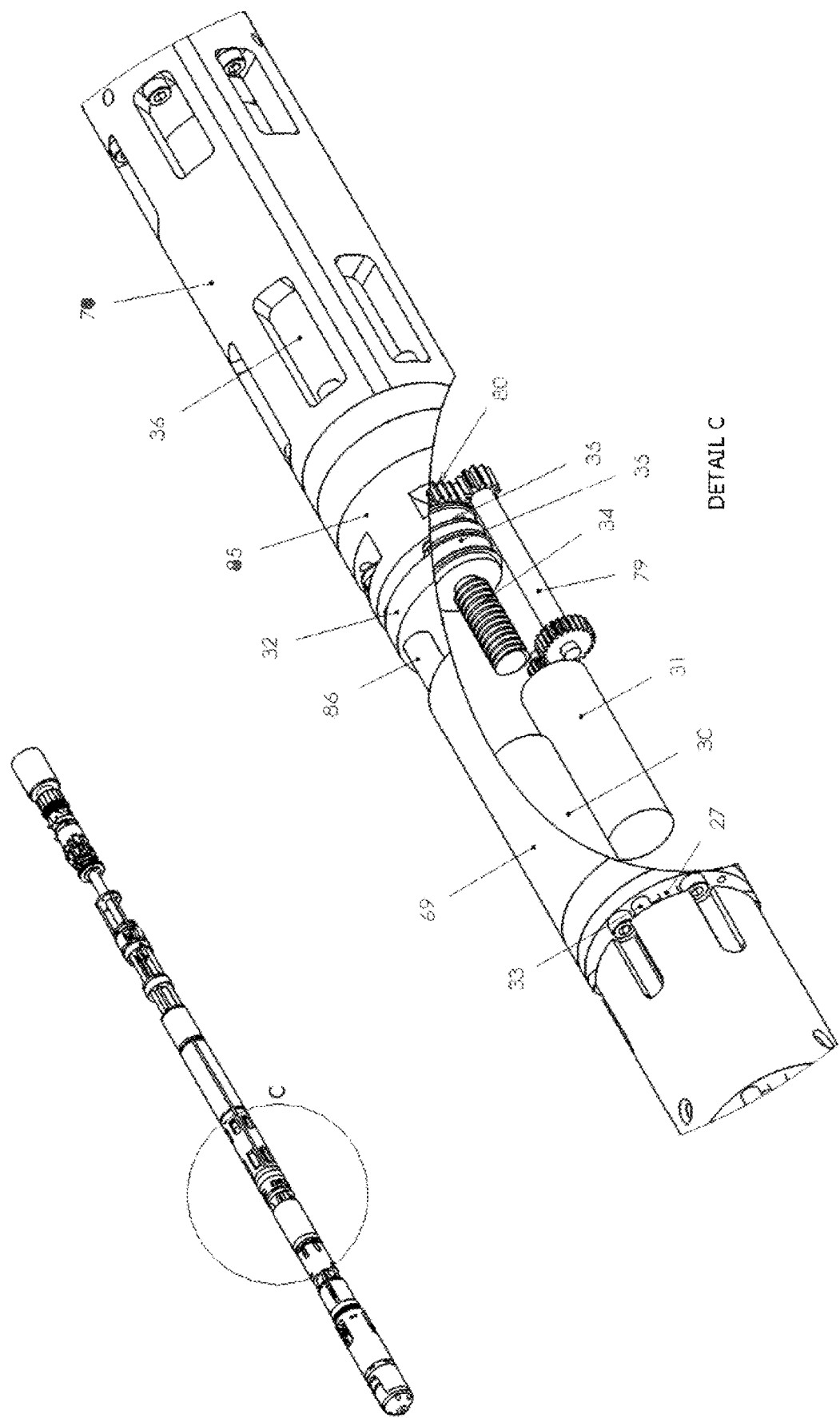
FIG. 21 shows a close up of the quill drive section of the tool with a portion of the chassis cut away to reveal the internal mechanism.

The quill (4) is sealed in the housing (21) just above the anchors. The quill (4) longitudinal position is controlled by quill drive rods (33) that are visible in FIGS. 15, 16 & 17. There are three drive rods (33) disposed evenly around the outer circumference of the tools inner chassis that couple the quill (4) to the quill drive nut (32) that is linearly displaced in the longitudinal axis by the quill drive lead screw (34). The main elements of the quill drive mechanism are perhaps best viewed in FIG. 21 that shows a close up of the quill drive with a section of the chassis cutaway to reveal the main internal mechanism. The quill drive lead screw (34) is attached to the chassis by thrust bearings (35) and driven by reduction gear chain (79, 80) from motor and gear box (31).

It can be seen that this arrangement allows the longitudinal position of the quill to be controlled by motor and gear box (31) with modest backlash in the lead screw (34) and gearing. Optionally, the leadscrew could be replaced with a ball screw which will improve efficiency but require more holding torque from motor and gearbox (31) to ensure the quill (4) does not move under chatter and vibration from the cutting arm (3).

The position of the quill can be computer controlled without any feedback sensors with the use of a stepper, synchronous, or brushless DC motor with sufficient torque; provided the control algorithm accounts for the backlash. This may be assisted with a computer control algorithm that cautiously drives the quill against its closed position (against the lower housing) to obtain a start reference without the need for a sensor. Optionally, feedback sensors can be provided to augment or even replace motor stepping control.

The quill drive motor (31) and radial drive motor (30) are housed back to back to save space in the control motor chassis (69). The quill drive rods (33, FIG. 14) pass through this chassis (69) and the head drive gearbox (28) and are attached to the quill (4) via brackets (68) that also serve to rotationally trap the quill in the lower anchor housing (21).

Electronics Module

The main control electronics are housed in a pressure housing (37) above the main cutting head drives and controls but below the anchor actuator. This minimises the wire run from electronics to the various motors and sensors and means the only wire that needs to be run out of the tool is a single power supply wire.

FIG. 16 reveals the atmospheric electronics module (38) with the pressure housing removed from the drawing. The electronics module (38) has an electronic pressure barrier connector that plugs into chassis electronics connector (39).

If some configuration or command of the integrated electronics was required then a simple communications over power scheme could be implemented, there are many straightforward ways of achieving this, perhaps using something as simple as ASK modulation, on the single power supply wire at the top of the tool.

Alternatively, it is practicable for the tool to be implemented with the various control wires run out of the oil filled tool body through a multi-wire pressure barrier in the upper tool connection (64) at the top of the tool. This would reduce the length of the mechanical section of the tool and provide easier access to the electronics for maintenance and offer more configuration options.

Anchor Drive

Figure 22:
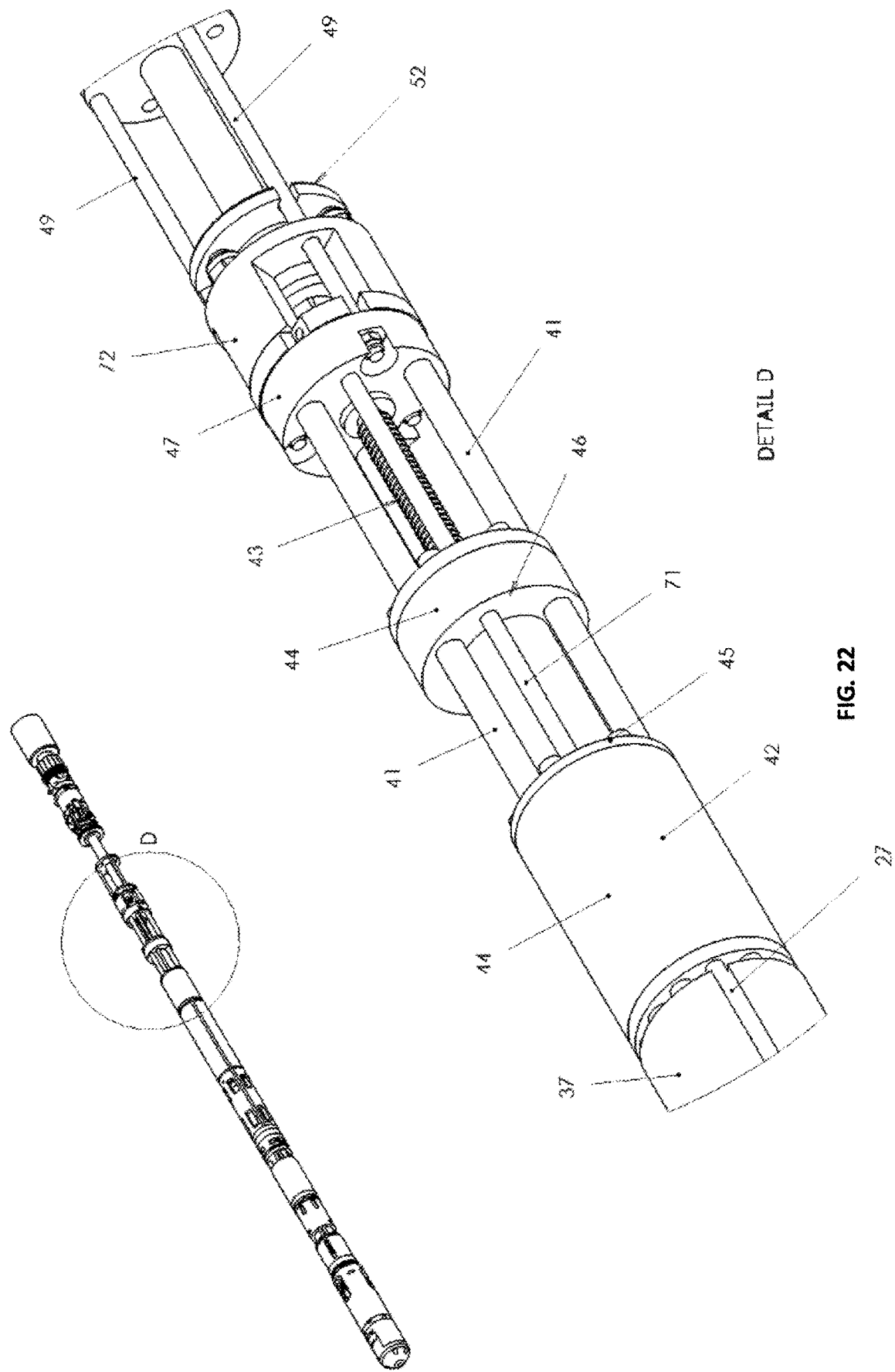
FIG. 22 shows a close up of the anchor drive mechanism, in the anchors closed state, with a cut away to reveal the main internal elements of mechanism.

The anchor actuator may be seen in the whole tool in FIGS. 15, 16 & 17 and a close up of the actuator with a cutaway panel is shown in FIG. 22. The anchor actuator uses a leadscrew (43) and geared nut arrangement (46) which, in this example with plain bearings, ensures the tension in the anchors is unlikely to back drive the leadscrew leading to slackening of the anchors under vibration while cutting. The plain bearing may be substituted with roller or ball thrust bearings, also the leadscrew could be changed to a ball screw. These substitutions would improve the efficiency of the anchor actuator but may require some form of lock mechanism to protect the anchors from slackening through back drive.

The motor and gear box (42) that drives the gear nut (46) via reduction shaft (45) are mounted in the anchor chassis (44) that is free to move axially on three slide shafts (41). Also mounted on the same slide shafts (41) is the upper drive plate (47) which is attached to the leadscrew (43). Thus, the operation of the anchor motor (42) will drive the upper drive plate (47) toward or away from the anchor chassis (44) independently of the tool chassis.

The anchor drive chassis (44) is connected by drive rods (27) to the lower anchors, while the upper drive plate (47) is connected to the upper anchors through rods (49), hollow drive shaft (53) and release collet (56). FIGS. 17 & 22 shows the anchors in the closed position, where the anchor drive chassis (44) is driven against the back of the electronics housing (37) by the leadscrew (43) pushing the upper drive plate (47) against the flexible coupling (72). Thus, in the closed position the mass of the anchor drive mechanism is secured in the chassis which consequently holds the anchors closed.

Getting the anchors to the closed position can be achieved crudely and simply by driving the anchor drive motor in the close direction until a rise in motor current is detected that indicates the park position has been reached. The optional use of a rubber bumper may be beneficial to slow the rate of rise in current thus ensuring timely detection and shutdown of the motor before any overload occurs. Alternatively, with the use of a rubber bump stop a micro switch may be used to give more positive detection of the park position.

To deploy the anchors the anchor drive chassis (44) pulls towards the upper drive plate (47) until the current drawn by the anchor drive motor exceeds a predefined level. Given that the current drawn by the motor is proportional to torque and hence tension in the anchor rods this results in the anchors being driven outwards until a predetermined load has been placed on the anchors. It should be apparent that this mode of operation will easily tolerate different pipe diameters at the front compared to the rear anchors.

It should be apparent that when the anchors are deployed, if the connection between the upper anchors and the anchor actuator is released then there will be no tension in any of the anchor control rods or on the lower anchors and the anchor actuator is free to move towards the electronics pressure housing (37). In this situation gravity will tend to close the lower anchors, but given the way the lower anchors are hinged, pulling up on the tool will certainly release the lower anchors and allow the tool to be pulled up and out of the pipe.

Top Sub and Release

In case of failure while the tool is anchored in the pipe it is desirable in some applications that the anchors can be forced to release and the tool recovered from the pipe. The way the disclosed anchor mechanism works means that any break in the drive linkage between the anchor actuator and the upper anchors will release the lower anchors.

Figure 23:
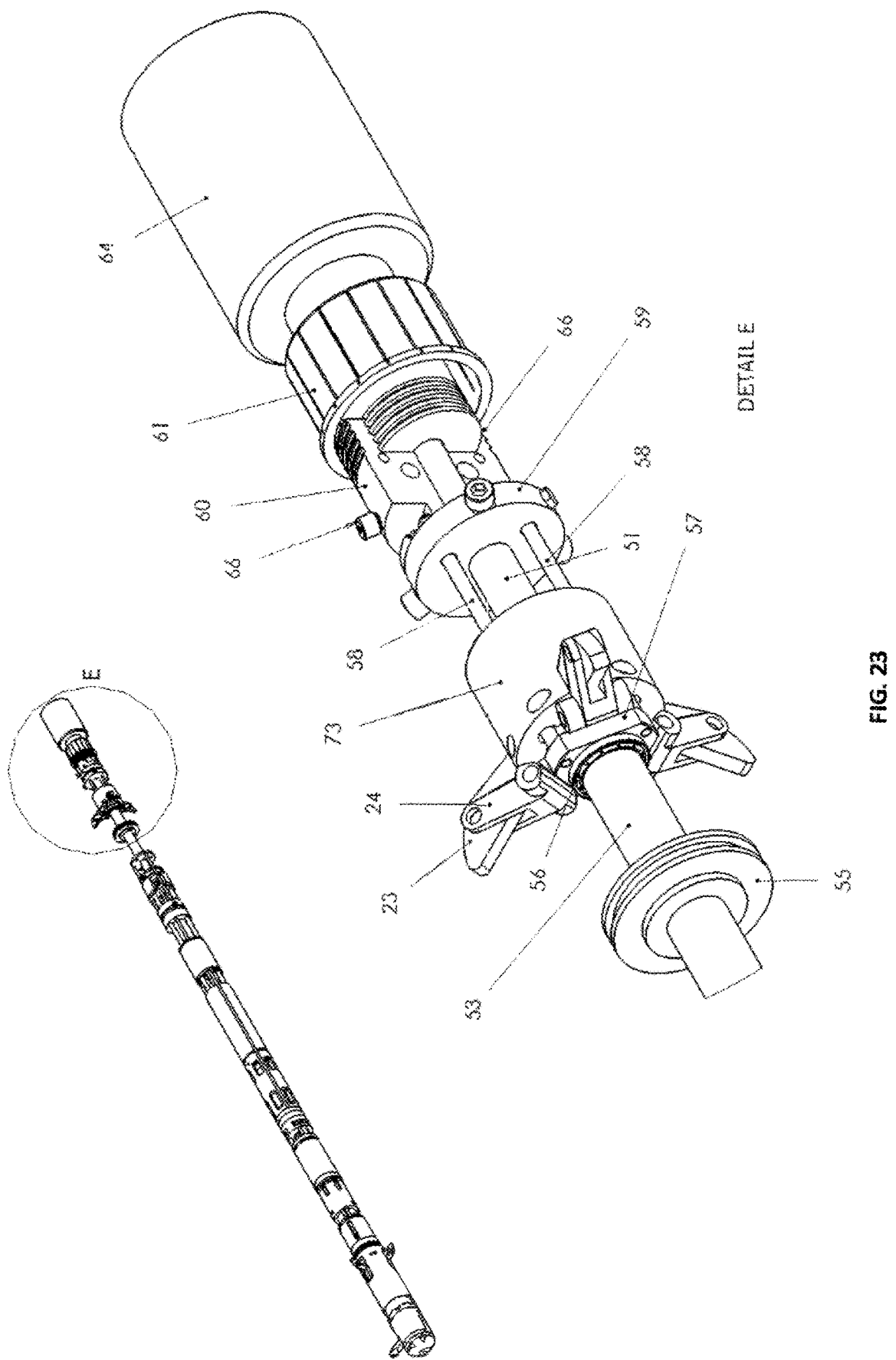
FIG. 23 shows a close up of the upper anchors and release mechanism with the anchors in the fully deployed condition.

FIG. 23 shows the anchor release mechanism at the top of the tool in the anchors fully deployed position. The upper anchor drive shaft (53) is coupled to the anchor shell (73) through a toothed collet (56). The circular teeth in the collet (56) engage with matching circular grooves in the upper anchor drive shaft (53). The collet (56) is held in the closed position by collet sleeve (57) which runs inside the anchor shell (73) such that while the collet sleeve (57) is in the position shown in the drawing (FIG. 23) all valid positions of the anchor drive shaft (53) keep the head of the collet in the collet sleeve (57) and thus locked to the anchor drive shaft (53).

The position of the collet sleeve (57) is controlled through control rods (58) by the position of the release load coupling (60). The release load coupling (60) is a split shell and only one of the two parts is shown in FIG. 23. The release load coupling (60) clamps around the upper tool connection (64) and engages with ribs that provide a very strong axial connection while allowing the upper tool connection (64) to rotate without transferring significant torque to the release load coupling (60). The release load coupling is held in place by shear pins (66) that pin it to the housing (54), thus upward jarring on the upper tool connection (64) will shear the pins (66) allowing the upper tool connection (64) to be pulled upwards, which in turn pulls the collet sleeve (57) upwards, first releasing the collet (56) and then pulling the anchor shell (73) up, thus closing the upper anchors.

Figure 24:
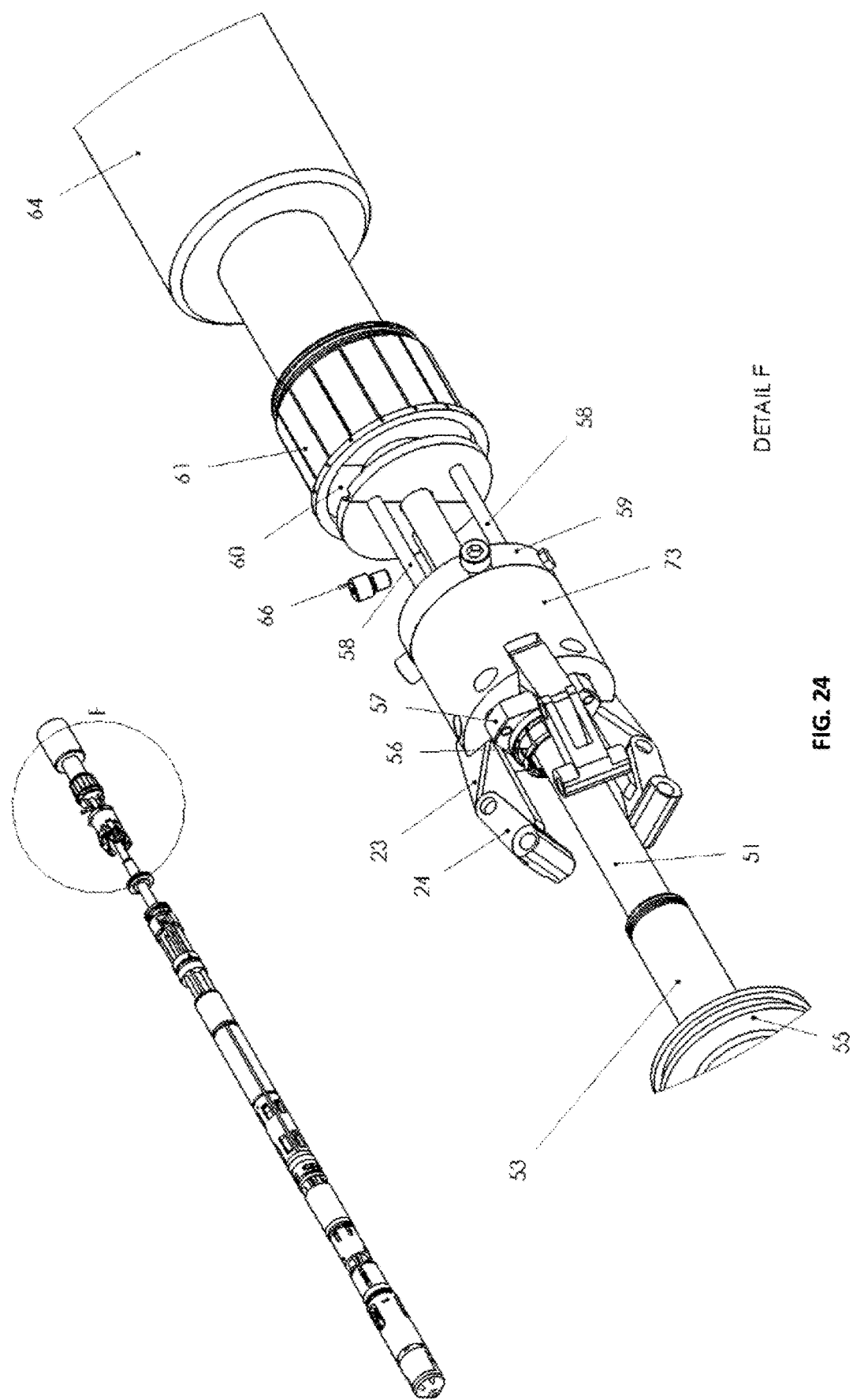
FIG. 24 shows a close up of the upper anchors and release mechanism where the shear pins have been sheared and the anchors closed detailed description.

FIG. 24 shows the upper anchor assembly when the shear pins (66) have been sheared. The release load coupling (60) has been pulled into ratchet collar (61) which prevents the upper tool connection (64) travelling back into the tool potentially redeploying the upper anchors or damaging the anchor drive shaft (53) and collet (56). A key way in the anchor housing (54) prevents the release load coupling (60) rotating under this condition.

One will observe the upper feedthrough shaft (51) passes through this entire upper anchor assembly and release mechanism into the upper tool connection (64). This shaft serves two main purposes; firstly it centralizes the anchor drive shaft (53) which the compensation piston (55) runs over. The upper feedthrough shaft itself is centralized in the upper housing (54) by centralising plate (59) which is a tight fit in the housing. It should be appreciated that the anchor shell (73) runs in the housing and not on the feedthrough shaft (51).

The feedthrough shaft (51) also carries the electrical connection out the top of the tool. In this embodiment with the electronics integral to the tool this is a single wire which will be connected to a battery pack above the tool or to a wireline for power. However, if it was desirable for the control electronics to be external to the oil filled section of the tool then this shaft provides sufficient space to run the motor control wires and any sensors to the top of the tool.

It should be appreciated that the feedthrough shaft (51) is filled with pressure compensated oil coupled into the body of the tool. Where the feedthrough shaft enters the upper tool connection (64) there is an electrical pressure barrier (63) that keeps the pressurised oil in the tool and allows the electrical wire(s) to enter an atmospheric chamber where batteries or electronics may be housed above the tool. The pressure compensated oil in the feedthrough shaft ensures that external pressure cannot act to drive the upper tool connection (64) down against the feedthrough shaft (51) preventing release.

When the release mechanism is activated, because the pressure barrier is attached to the upper tool connection (64) its upward movement will disconnect it electrically from the cutting tool. This is beneficial as it ensures the tool has no power and is not able to try and operate which way cause further damage to the tool.

Referring to FIG. 14, it should be apparent that if the tool is arranged with a small gap between the upper tool connection (64) and the upper closing cap (62) then jarring down on the tool will also shear the shear pins (66) and release the anchors. However, if there is a negligible gap between the upper tool connection (64) and the upper closing cap (62), this could be achieved with tight tolerances or shimming, then downward jarring will be transmitted through the body of the tool and not shear the shear pins, thus only upward jarring can release the tool, which will prevent inadvertent release when running into the pipe.

In summary, there is provided apparatus for removing material from an internal surface of a pipe (1). The apparatus comprises a low-power cutting tool for insertion into the pipe (1) and configured to remove material from an internal surface of the pipe (1). The cutting tool comprises a housing (5) for insertion within the pipe, a cutting head (2) extending from the housing and comprising a cutting tip (7) for machining the internal surface of the pipe (1) in a machining operation when the cutting tool is inserted into the pipe (1), and one or more actuators (30, 31, 36) for driving the cutting tip (7) during the machining operation. The apparatus further comprises one or more processors, and a computer-readable memory storing instructions which, when executed by the one or more processors, control the one or more actuators (30, 31, 36) to cause the cutting tip to machine the internal surface of the pipe (1) to remove material therefrom in the machining operation, such that the cutting tool is maintained in a low-power configuration.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The disclosure extends to the following numbered clauses:

1) A method of cutting a groove inside a pipe using a pointed cutting tip that is rotated concentrically in the pipe while being extended radially and moved in the longitudinal axis of the pipe.

2) A method according to clause 1, wherein the groove is cut by repeatedly sweeping the rotating cutting tip back and forward along one edge of the groove being cut at a speed that provides a particular cutting feed, while also advancing the cutting tip in the longitudinal axis of the pipe to create a cutting advance that causes the cutting tip to remove material.

3) A method according to clause 1, wherein the groove is cut by repeatedly sweeping the rotating cutting tip back and forward in the longitudinal axis of the pipe at a speed that provides a particular cutting feed, while advancing the tip in the radial direction to create a cutting advance to cause the cutting tip to remove material.

4) A method according to clause 2 or 3, wherein the cutting feed is less than 0.1 mm and the advance is less than 0.3 mm.

5) A method according to any clause 1 to 4, wherein the cutting movements provide clearance angles between the cutting tip edges and the edges of the groove being cut.

6) A method according to clause 5, wherein the provided clearance angle, on at least one side of the cutting tip, is in the range of 5 to 10 degrees.

7) A method according to clause 5 or 6, wherein the provided clearance angle on one side of the cutting tip is at least 5 degrees greater than the clearance angle on the other side of the cutting tip.

8) A method according to any clause 2 to 7, wherein the cutting arm start position is found by driving the rotating cutting arm in the radial direction until the cutting load increases.

9) A method according to any clause 4 to 8 when dependent on claim 2 or 3, wherein the cutting feed is adjusted in order to meet a configured target load current or load power being consumed by an apparatus implementing the method.

10) A method according to clause 9, wherein the advance of cut is also adjusted to assist in meeting the configured target load current or load power.

11) A method according to any clause 1 to 10 that includes the step of lifting the cutting tip away from the pipe to interrupt the cutting at regular intervals.

12) A method according to any preceding clause, wherein the groove is extended out through the pipe to sever the pipe.

13) A method according to clause 12, wherein a reduction in cutting load is used to detect the end of the cutting operation.
14) An internal pipe cutting tool comprising: a mechanism to anchor the tool in the pipe; a rotating cutting head that can be moved to a position disposed from the tool in the longitudinal axis of the pipe; and a pointed cutting tip mounted on a cutting arm that is mounted on the rotating cutting head such that the cutting arm and cutting tip can be moved in a radial direction relative to the cutting head.
15) A tool according to clause 14, wherein the movement of the cutting head in the longitudinal axis is controlled by a dedicated drive motor.
16) A tool according to clause 14 or 15, wherein the movement of the cutting arm in the rotating cutting head is controlled by a dedicated drive motor mounted in the non-rotating area of the tool.
17) A tool according to clause 16, further comprising a mixing gearbox to combine the drive of the rotating cutting head with the drive of the cutting arm movement into a pair of concentrically rotating shafts.
18) A tool according to clause 17, wherein the said mixing gearbox comprises a planetary gear arrangement.
19) A tool according to clause 14 or 15, wherein the movement of the cutting arm in the radial direction is controlled by a dedicated drive motor mounted in the rotating cutting head.
20) A tool according to clause 19, using slip rings to electrically connect between the dedicated drive motor in the rotating cutting head and the non-rotating area of the tool.
21) A tool according to any clause 15 to 20, wherein all said dedicated drive motors are either a stepping motor, synchronous motor or brushless DC motor type.
22) A tool according to any clause 14 to 21, wherein the said cutting arm moves along a compound axis between the radial and longitudinal axis of the tool.
23) A tool according to any clause 14 to 22, further comprising a release mechanism that comprises of shear pins that when sheared will activate the release mechanism and free the anchor mechanism.
24) A tool according to any clause 14 to 23, further comprising a taper on the back of the cutting head that mates with a taper on the housing for the protection of the cutting head bearings when the cutting head is pulled against the housing.
25) A tool according to any clause 14 to 24, further comprising an implementation of the cutting method defined by any valid method claims 1 to 13.

The invention claimed is:
1. An Apparatus comprising:
 a low-power cutting tool for insertion into a pipe and configured to remove material from an internal surface of the pipe, the cutting tool comprising:
  a housing for insertion within the pipe;
  a cutting head extending from the housing and comprising a cutting tip for machining the internal surface of the pipe in a machining operation when the cutting tool is inserted into the pipe; and
  one or more actuators for driving the cutting tip during the machining operation;
 one or more processors; and
 a computer-readable memory storing instructions which, when executed by the one or more processors:
  control the one or more actuators to cause the cutting tip to machine the internal surface of the pipe to remove material therefrom in the machining operation, such that the cutting tool is maintained in a low-power configuration,
  the low-power configuration being wherein an electrical power requirement is controlled not to exceed a predetermined electrical power threshold,
  wherein, in the low-power configuration, an operational parameter of the one or more actuators is controlled to maintain the cutting tool in the low-power configuration, and
  wherein the operational parameter being indicative of a movement of the cutting tip.

2. The apparatus of claim 1, wherein the operational parameter is indicative of an electrical power requirement of the one or more actuators driving the cutting tip, and wherein the electrical power requirement is controlled not to exceed a predetermined electrical power threshold of less than 200 watts.

3. The apparatus of claim 1, wherein the operational parameter is indicative of a cutting width of the cutting tip during the machining operation.

4. The apparatus of claim 3, wherein the cutting width of the cutting tip is controlled to be less than 1 millimetre during the machining operation.

5. The apparatus of claim 1, wherein the cutting head comprises exactly one cutting tip and wherein substantially all of the material removed from the internal surface of the pipe during the machining operation is removed using the exactly one cutting tip.

6. The apparatus of claim 1, wherein the instructions stored by the memory, when executed by the one or more processors, determine a machining path relative to the internal surface of the pipe for carrying out the machining operation, and cause the cutting tip to follow the machining path in the machining operation.

7. The apparatus of claim 6, wherein the machining path defines at least one parameter representative of a speed of movement of the cutting tip.

8. The apparatus of claim 6, wherein the machining path is defined such that a cutting width of the cutting tip substantially never exceeds a default cutting width of the cutting tip, the default cutting width being an extent of the cutting tip in contact with the internal surface of the pipe during at least 50 percent of the machining operation.

9. The apparatus of claim 6, wherein the machining path is to cause the cutting tip to move into the internal surface of the pipe in an incline direction having a component in a longitudinal direction along the pipe.

10. The apparatus of claim 9, wherein the incline direction makes an angle of at least 10 degrees to a radial direction transverse to the longitudinal direction and radially outwards from the housing to the internal surface of the pipe.

11. The apparatus of claim 6, wherein the machining path comprises:
 a first portion configured to cause the cutting tip to remove a first volume of material extending around a whole circumference of the pipe;
 a second portion after the first portion and configured to cause the cutting tip to remove a second volume of material, bordering the first volume of material; and
 a third portion configured to occur between the first portion and the second portion in which no material is removed from the internal surface of the pipe.

12. The apparatus of claim 11, wherein the one or more actuators is a plurality of actuators comprising a first actuator and a second actuator, and wherein during the first portion and the second portion, the first actuator is configured to cause the cutting tip to rotate about a longitudinal axis of the pipe to remove material from the whole circumference of the pipe, and the second actuator is configured to cause the cutting tip to move in a cutting direction having a component in a longitudinal direction along the pipe.

13. The apparatus of claim 12, wherein the plurality of actuators comprises a third actuator, and wherein between the first portion and the second portion of the machining path, the third actuator is configured to at least partially cause the cutting tip to move between the first portion and the second portion.

14. The apparatus of claim 13, wherein the third actuator is configured to cause the cutting tip to move in a longitudinal direction along the pipe.

15. The apparatus of claim 1, wherein the machining operation is to cause the apparatus to cut entirely through the internal surface of the pipe to an external surface of the pipe.

16. The apparatus of claim 1, wherein the one or more actuators are arranged to cause the cutting tip to machine the internal surface of the pipe to remove material therefrom in the machining operation without movement of the housing in a longitudinal direction along the pipe.

17. The apparatus of claim 1, wherein the instructions stored by the memory, when executed by the one or more processors, determine a position of the cutting tip in dependence on an electricity metric indicative of a current draw of at least one of the one or more actuators.

18. The apparatus of claim 1, wherein the cutting tool further comprises a deployable anchor for securing the cutting tool at a machining position within the pipe; and a frangible portion between the housing and the cutting tip, such that the cutting tip can be broken away from the cutting tool.

* * * * *